(12) United States Patent
Tsukamoto

(10) Patent No.: US 7,197,697 B1
(45) Date of Patent: Mar. 27, 2007

(54) APPARATUS FOR RETRIEVING INFORMATION USING REFERENCE REASON OF DOCUMENT

(75) Inventor: Koji Tsukamoto, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 584 days.

(21) Appl. No.: 09/594,029

(22) Filed: Jun. 15, 2000

(30) Foreign Application Priority Data

Jun. 15, 1999 (JP) .................... 11-168552

(51) Int. Cl.
*G06F 17/21* (2006.01)
*G06F 15/00* (2006.01)
*G06F 17/00* (2006.01)

(52) U.S. Cl. ...................... 715/509; 715/500
(58) Field of Classification Search ............ 715/501.1, 715/513, 514, 530, 500, 509; 707/1–7, 102
See application file for complete search history.

(56) References Cited

U.S. PATENT DOCUMENTS

| | | | | |
|---|---|---|---|---|
| 5,794,236 A | * | 8/1998 | Mehrle ........................... | 707/5 |
| 5,819,260 A | * | 10/1998 | Lu et al. ......................... | 707/3 |
| 5,832,494 A | * | 11/1998 | Egger et al. ................. | 707/102 |
| 5,870,770 A | * | 2/1999 | Wolfe .......................... | 345/805 |
| 5,926,811 A | * | 7/1999 | Miller et al. .................... | 707/5 |
| 6,044,378 A | * | 3/2000 | Gladney ................. | 707/103 R |
| 6,185,592 B1 | * | 2/2001 | Boguraev et al. ............ | 715/531 |
| 6,233,571 B1 | * | 5/2001 | Egger et al. ..................... | 707/2 |
| 6,263,351 B1 | * | 7/2001 | Wolfe ...................... | 715/501.1 |
| 6,286,018 B1 | * | 9/2001 | Pitkow et al. ............... | 715/513 |
| 6,289,342 B1 | * | 9/2001 | Lawrence et al. .............. | 707/7 |
| 6,295,542 B1 | * | 9/2001 | Corbin ..................... | 715/501.1 |
| 6,356,922 B1 | * | 3/2002 | Schilit et al. ................ | 715/512 |
| 6,360,215 B1 | * | 3/2002 | Judd et al. ...................... | 707/3 |
| 6,370,551 B1 | * | 4/2002 | Golovchinsky et al. ..... | 715/512 |
| 6,374,209 B1 | * | 4/2002 | Yoshimi et al. ................. | 704/9 |
| 6,502,081 B1 | * | 12/2002 | Wiltshire et al. ............. | 706/12 |
| 6,529,911 B1 | * | 3/2003 | Mielenhausen ............. | 707/100 |

FOREIGN PATENT DOCUMENTS

| | | |
|---|---|---|
| JP | 63-153630 | 6/1988 |
| JP | A-63-153630 | 6/1988 |
| JP | A-63-228221 | 9/1988 |
| JP | A-1-191258 | 8/1989 |
| JP | A-6-282534 | 10/1994 |
| JP | A-7-311780 | 11/1995 |
| JP | 08-272818 | 10/1996 |
| JP | A-8-272818 | 10/1996 |
| JP | A-9-146968 | 6/1997 |
| JP | A-10-105572 | 4/1998 |
| JP | 11-053395 | 2/1999 |

OTHER PUBLICATIONS

Japanese Office Action (Notice of Rejection Grounds) for Application No. H11-168522; mailed Nov. 15, 2005.

* cited by examiner

*Primary Examiner*—Heather R. Herndon
*Assistant Examiner*—Paul H. Nguyen-Ba
(74) *Attorney, Agent, or Firm*—Staas & Halsey LLP

(57) ABSTRACT

The reference reason of a reference document is identified by analyzing a position where the reference document is cited in document data, a method by which the reference document is cited, a sentence in the document data, etc. Then, documents are retrieved and classified using a reference correlation including this reference reason.

19 Claims, 28 Drawing Sheets

| INPORTANT DOCUMENT ( SIMILAR REFERENCE, COMMON REFERENCE ) |
|---|
| Aone, C. and Bennett, S. W. (1995)"....<br>Byron, D. and Stent, A. (1998)"....<br>Dohsaka, K. (1990)" |

FIG. 1B

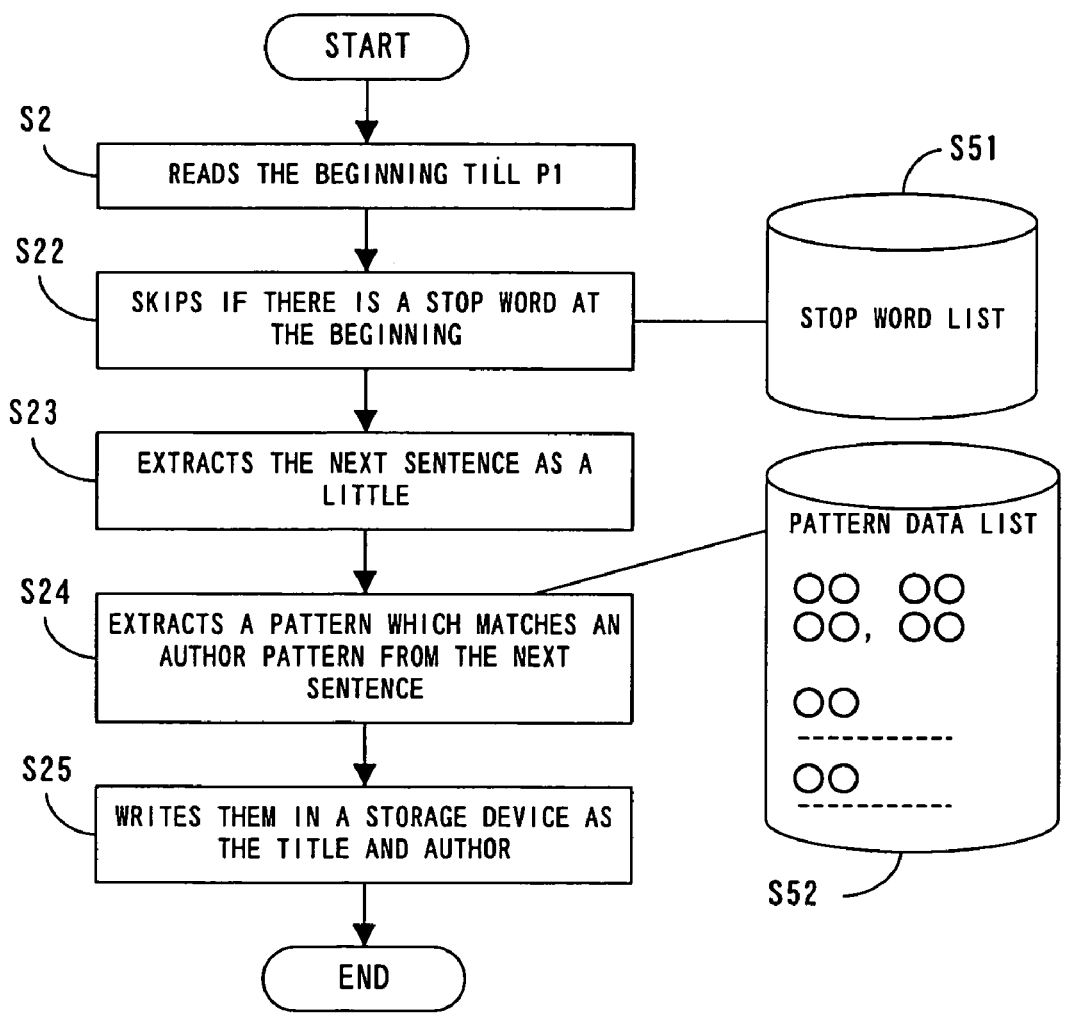
F I G. 4

P1 →
● Jpn.J.Appl.Phys.Vol.38(1999)
Morphology Evolution of SiO2 Films Deposited by
  TEOS/O3 APCVD on Thermal SiO2
Koji TSUKAMOTO, Degang CHENG,···
  ......

KEYWORDS; tetraethylorthosilicate, ozone, ···
1 Introduction
  ......

Some methods have been proposed···[6, 8, 10-13] However, most of ···

......

3 Results and Discussion.

......

Similar results were also reported by other groups. [8,11,13]

P2 →
  ......
Reference
  ......

6) K. Fujino, M. Nishimoto,···J. Electrochem. Soc. 138(1991) 550

......

(Koji Tsukamoto et. al. (1999), *Morphology Evolution of SiO2 Films Deposited by TEOS/O3 APCVD on Thermal SiO2*, Jpn. J. Appl. Phys. )

A
basic
　←B, C
　→X, Y, Z
review
　←D
　→W, V
contraposition
　←E, F
　→Z
......

B
basic ......

FIG. 10

ANSWER

Aone, C. and Bennett, S. W. (1995)"....
......

APPLICATION

Byron, D. and Stent, A. (1998)"....
Dohsaka, K. (1990)"....
......

FIG. 14

TIME

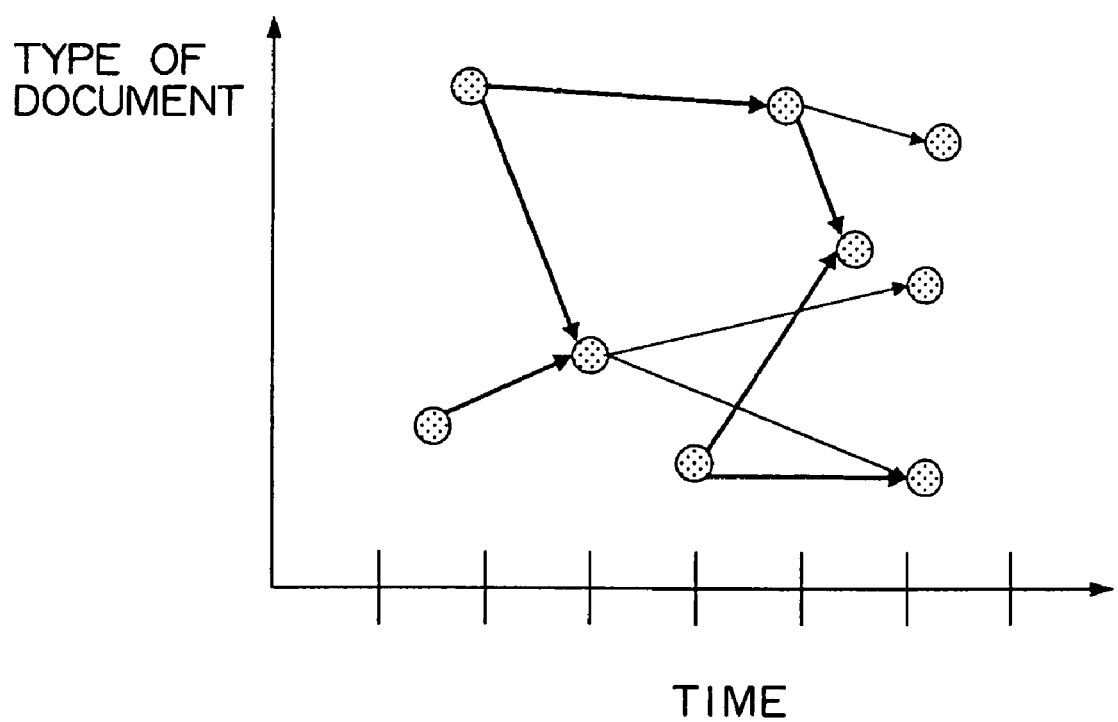
F I G. 24

APPARATUS FOR RETRIEVING INFORMATION USING REFERENCE REASON OF DOCUMENT

BACKGROUND OF THE INVENTION

1. Field of the Invention

The present invention relates to information retrieval for retrieving information from documents, etc., and in particular an apparatus for identifying a reference reason and retrieving information using the reference reason if there is a referring/referred correlation between documents.

2. Description of the Related Art

Several technologies are proposed to search for a reference correlation if there is a referring/referred correlation between documents. Such technologies include the following Japan patent applications.

(1) Japan Patent Laid-open No. 63-228221 (Mitsubishi Electric)

The reference correlation between documents are stored, and retrieval is conducted based on some clue information using a fuzzy logical operation.

(2) Japan Patent Laid-open No. 63-153630 (NEC)

Documents having a common reference correlation can be retrieved utilizing the referred-correlation between documents and using a reference document as a retrieval item. Documents having a common reference correlation are documents which have a common reference document and are considered to have an important correlation between them.

(3) Japan Patent Laid-open No. 1-191258 (Ricoh)

Both the text of a document and the name of a reference document automatically extracted from the text are simultaneously presented to simplify editing.

(4) Japan Patent Laid-open No. 6-282534 (NEC)

The fact that a specific document is cited is automatically notified to the user of the referred document.

(5) Japan Patent Laid-open No. 7-311780 (Cannon)

Documents related to a specific document are searched for based on a reference correlation. The search results are displayed in descending order of importance. The importance of a document is determined based on the reference frequency of the document.

(6) Japan Patent Laid-open No. 8-272818 (New Nippon Steel)

If a document is designated, documents related to the document are displayed, and further retrieval becomes possible by selecting the displayed document.

(7) Japan Patent Laid-open No. 9-146968 (Hitachi)

Other documents which make a reference similar to that made by a specific document are searched for.

(8) Japan Patent Laid-open No. 10-105572 (NEC)

It is judged whether there is some correlation between documents using both a reference correlation and a keyword, and a document aggregate is generated based on the judgment.

FIG. 1A shows such a conventional information retrieval system. This system comprises a retrieval apparatus 1, a full text database 2 and an reference correlation database 3. If a document is inputted, both a document which has a common reference correlation and a document which makes a similar reference are displayed as related documents. The retrieval unit 5 of the retrieval apparatus 1 retrieves documents in the full text database 2, and the selection unit 6 of the retrieval apparatus 1 selects related documents using the reference correlation in the reference correlation database 3.

Information about related documents are displayed, for example, in a format shown in FIG. 1B. If there are a plurality of related documents, for example, the related documents are displayed in descending order of importance.

In the applications other than 8-272818 and 10-105572 of the Japan patent applications described above, basically only alternative reference correlations are used. One of the correlations indicates that a reference is made and the other indicates that a reference is not made.

In 8-272818, the positioning of a reference correlation is also displayed. In this case, some information must be attached in advance to the reference correlation by a human being. In 10-105572, it is judged whether there is some correlation between documents using both a reference correlation and a keyword.

As described above, in the conventional arts, the alternative information of whether there is some correlation between documents is used as the correlation between documents.

However, the conventional information retrieval system described above has the following problems.

In 7-311780, related documents are displayed as important documents in the descending order of the reference frequency of documents. In this case, a user must judge the importance of documents individually according to the criterion uniquely provided by the equipment side.

In other conventional arts, reference correlation is displayed using the alternative information of whether a document is referred to, analysis is made from one viewpoint of "whether a document is important" for a specific document and documents are searched for. A retrieval system using such alternative information has the following disadvantages.

(1) The reason why a document is important cannot be provided to a user.

(2) Analysis made from one viewpoint of whether a document is important can indicate no correlation between documents.

(3) Even if it is known what type of document is necessary, all related documents are displayed together.

In such a system, if, for example, a scientific document is retrieved, a document which has no direct correlation to a topic, such as a document on a new technology, a document on widely used software, etc., are often displayed with higher rankings. In this case, these documents are often not documents that should be retrieved. The conventional system cannot avoid such a problem.

SUMMARY OF THE INVENTION

An object of the present invention is to provide an apparatus for identifying a reason why a document is referred to by a specific document and for efficiently retrieving a document using the identified reference reason.

A reference reason identifying apparatus in the first aspect of the present invention comprises a referred document extracting device, a reference position extracting device, an identification device and an output device.

The referred document extracting device extracts document information about a referred document from given document data. The reference position extracting device extracts information about a position where the referred document is cited in the document data. The identification device analyzes information extracted by the reference position extracting device and identifies a reason why the referred documented is cited. The output device outputs output information including both the information extracted by the referred document extracting device and the reason why the referred document is cited.

An information retrieval apparatus in the second aspect of the present invention comprises a document database, a reference correlation storage device, a retrieval device and an output device.

The document database stores document data. The reference correlation storage device stores a reference correlation including a reason why the referred document is cited by a specific document. The retrieval device retrieves document data stored in the document database using the reference correlation stored in the reference correlation storage device. The output device outputs the retrieval result including the reference reason.

A document classifying apparatus in the third aspect of the present invention comprises a referred document extracting device, a reference position extracting device, an identification device, a similarity identification device and an output device.

The referred document extracting device extracts document information about the referred document from given document data. The reference position extracting device extracts information about a position where the referred document is cited in the document data. The identification device analyzes the information extracted by the reference position extracting device and identifies a reason why the referred document is cited. The similarity identification device calculates a similarity between reference correlations, each of which includes a reason why the referred document is cited, for a plurality of pieces of document data and classifies the pieces of the document data. The output device outputs a classification result.

BRIEF DESCRIPTIONS OF THE DRAWINGS

FIG. 1B shows a conventional display format.

FIG. 4 is a flowchart showing the process of a bibliographical information analysis unit.

FIG. 8 shows an example of a document.

FIG. 9 shows the first reference correlation.

FIG. 10 shows the second reference correlation.

FIG. 14 shows the second display of the retrieval result.

FIG. 24 shows the second time series.

DESCRIPTION OF THE PREFERRED EMBODIMENTS

The preferred embodiments of the present invention are described in detail below with reference to the drawings.

Figure 1A:
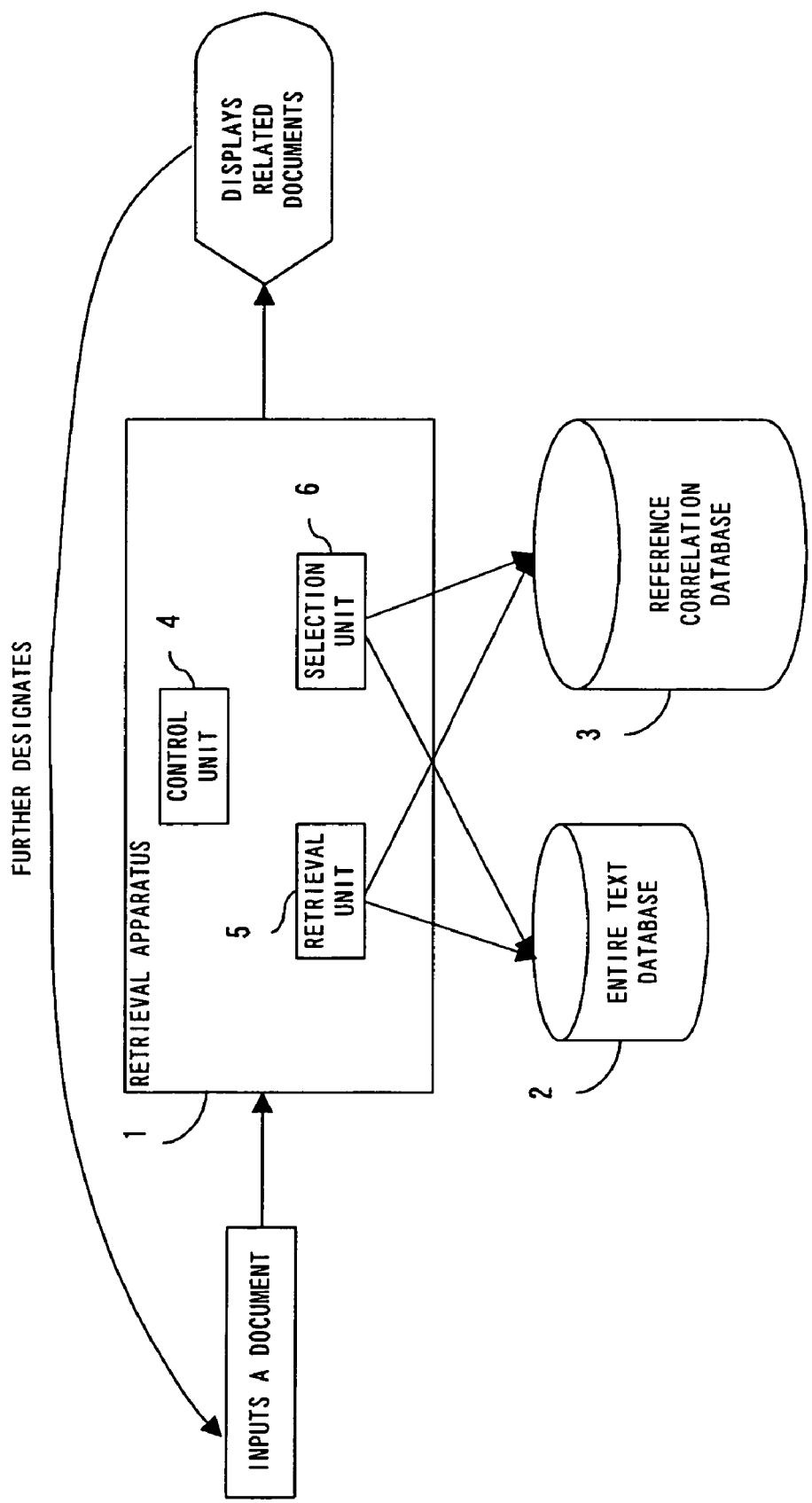
FIG. 1A shows a conventional information retrieval system.
Figure 2A:
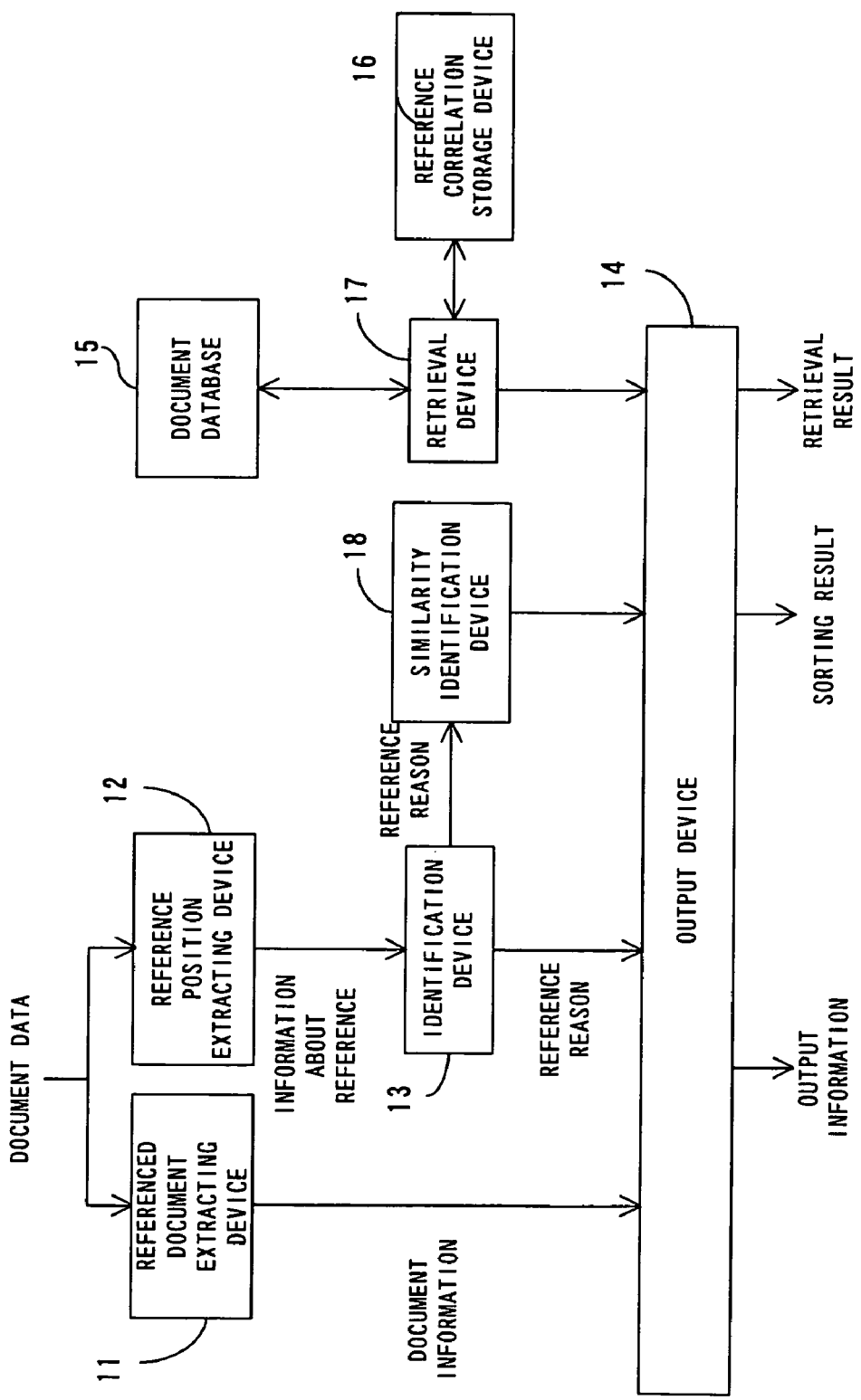
FIG. 2A shows the basic configuration of the present invention.

FIG. 2A shows the basic configuration of the present invention. In the first aspect of the present invention, the apparatus shown in FIG. 2A corresponds to a reference reason identifying apparatus, and comprises a referred document extracting device 11, a reference position extracting device 12, an identification device 13 and an output device 14.

The referred document extracting device 11 extracts document information about a referred document from given document data. The reference position extracting device 12 extracts information about a position where the referred document is cited in the document data. The identification device 13 analyzes information extracted by the reference position extracting device 12 and identifies a reason why the referred documented is cited. The output device 14 outputs output information including both the information extracted by the referred document extracting device 11 and the reason why the referred document is cited.

For example, a referred document corresponds to a reference document, etc., cited in given document data, and the referred document extracting apparatus 11 extracts document information, such as the title, the name of author, etc., of the referred document from the document data. The reference position extracting device 12 searches for a position (reference position) where the referred document is cited using the number, etc., of the reference document in the document data and extracts information about a chapter to which the position belongs, information about the character string, etc., in the neighborhood of the position, etc.

The identification device 13 also identifies a reason (reference reason) why the referred document is cited in the position based on the extracted information about the reference position. The output device 14 relates the document information of the referred document to the reference reason and outputs the information.

According to such a reference reason identifying apparatus, both the document information of the referred document and the reference reason are automatically extracted from document data and are presented to a user. Therefore, the user can recognize why each referred document is cited by a referring document and estimate the importance of the referred document from the reference reason. The user can also retrieve a document using the reference reason.

In the second aspect of the present invention, the apparatus shown in FIG. 2A corresponds to an information retrieval apparatus, and comprises a document database 15, a reference correlation storage device 16, a retrieval device 17 and an output device 14.

The document database 15 stores document data. The reference correlation storage device 16 stores a reference correlation including a reason why the a referred document is cited by a specific document. The retrieval device 17 retrieves document data stored in the document database 15 using the reference correlation stored in the reference correlation storage device 16. The output device 14 outputs the retrieval result including the reference reason.

The document database 15 corresponds to, for example, a full text database and stores document data to be retrieved. The reference correlation storage device 16 stores information about the reference correlation indicating not only that a document is cited by another document but also the reference reason. The retrieval device 17 retrieves document data in the document database 15 using the reference reason included in the stored reference correlation. The output device 14 outputs the information of the obtained document data based on the reference reason used for the retrieval.

According to such an information retrieval apparatus, since the retrieved referred document is presented to a user together with the reference reason, the user can estimate the importance of the referred document from the reference reason. The user can also retrieve documents by designating an appropriate reference reason which meets his or her requirement, and thereby efficient retrieval can be implemented.

In the third aspect of the present invention, the apparatus shown in FIG. 2A corresponds to a document classifying apparatus, and comprises a reference document extracting device 11, a reference position extracting device 12, an identification device 13, a similarity identification device 18 and an output device 14.

The referred document extracting device 11 extracts document information about the referred document from given document data. The reference position extracting device 12 extracts information about a position where the referred document is cited in the document data. The identification device 13 analyzes the information extracted by the reference position extracting device 12 and identifies a reason why the referred document is cited. The similarity identification device 18 calculates the similarity between reference correlations, each of which includes a reason why the referred document is cited, for a plurality of pieces of document data, and classifies the pieces of the document data. The output device 14 outputs a classification result.

For example, if the reference reasons of a referred document cited in two pieces of document data are given, the similarity identification device 18 calculates the similarity between the reference correlations by comparing the reference reasons. If in this way, the similarities of all pairs of document data in the plurality of the pieces of the document data are calculated, all pieces of the document data can be classified based on the similarities. The output device 14 outputs the information of the document clusters, etc., as the classification result.

According to such a document classifying apparatus, both the document information of the referred documents and the reference reasons are automatically extracted from a plurality of document data, and the plurality of document data are automatically classified based on the reference correlations. Therefore, a user can obtain the information of document groups classified based on a reference correlation, including a reference reason, and the user can also retrieve documents using the information.

Figure 2B:
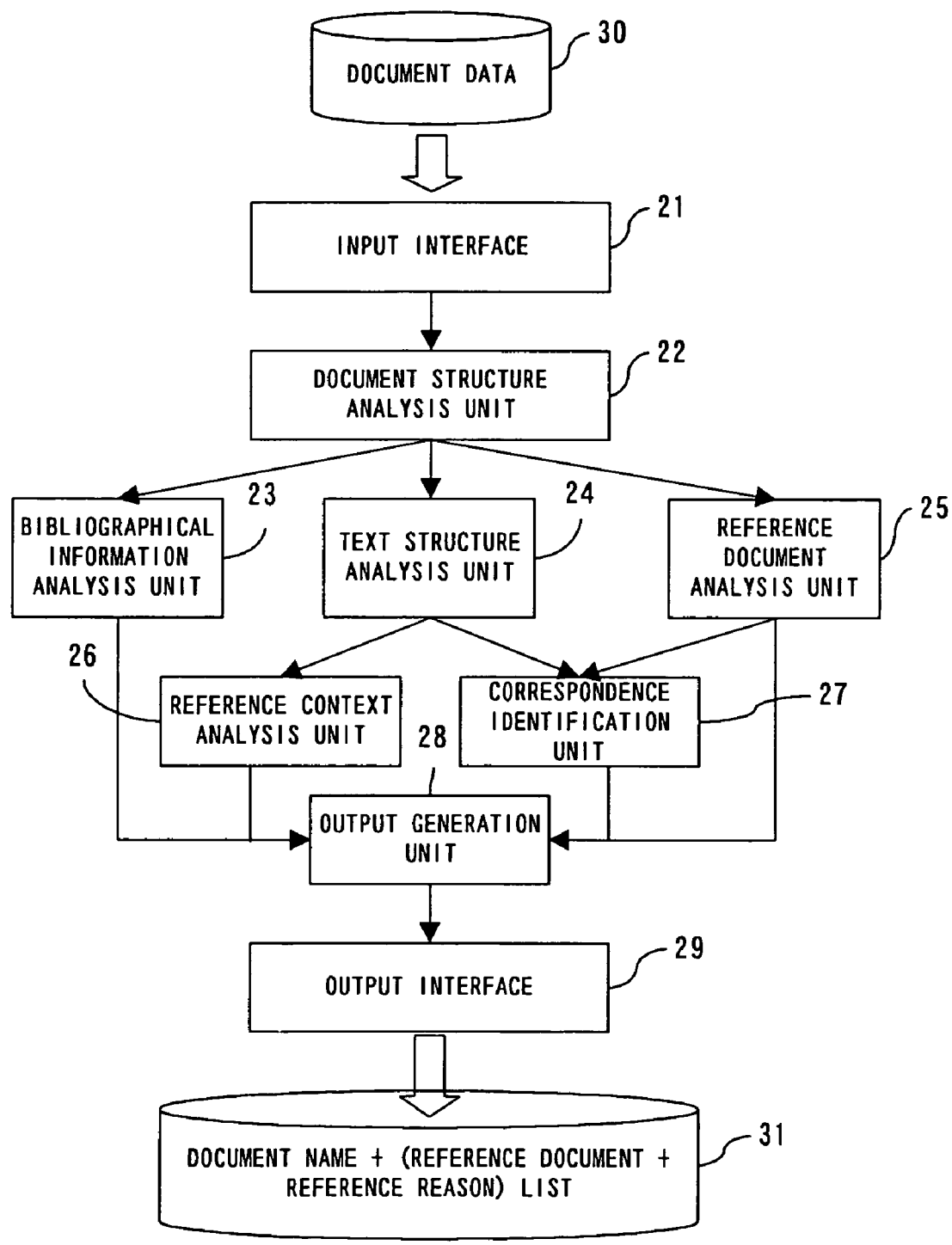
FIG. 2B shows the configuration of a reference reason identifying apparatus.

For example, the referred document extracting device 11 shown in FIG. 2A corresponds to both a document structure analysis unit 22 and a reference document analysis unit 25 shown in FIG. 2B, which is described later. The reference position extracting device 12 shown in FIG. 2A corresponds to both a document structure analysis unit 22 and a text structure analysis unit 24, which are shown in FIG. 2B. The identification 13 shown in FIG. 2A corresponds to a reference context analysis unit 26 shown in FIG. 2B. The output device 14 shown in FIG. 2A corresponds to a correspondence identification unit 27, an output generation unit 28 and an output interface 29, which are shown in FIG. 2B.

For example, the document database 15 shown in FIG. 2A corresponds to a full text database 2 shown in FIG. 11, which is described later, the reference correlation storage device 16 shown in FIG. 2A corresponds to a reference correlation database 95 shown in FIG. 11 and the retrieval device 17 shown in FIG. 2A corresponds to a retrieval device 92 shown in FIG. 11.

For example, the similarity identification unit 18 shown in FIG. 2A corresponds to a similarity identification device 152 shown in FIG. 23, which is described later.

Generally speaking, if a system is provided in advance with the feature data of a reference correlation as data on a reference reason (correlation data), it is possible to present the existence/non-existence of reference to a user, but it is impossible or very difficult to present a plurality of reference reasons to a user. However, if a system is provided in advance with a plurality of data on reference reasons, it is easy to present the existence/non-existence of reference and it is also comparatively easy to present a plurality of reference reasons to a user. Therefore, if data on reference reasons are stored in a system in advance, necessary information can be efficiently searched for using the data.

First, concerning the identification of a reference reason, a reason why a referred document is cited can be identified by analyzing the appearance position, reference method, sentence, etc., of the referred document in the referring document. In this analysis, for example, the following features are extracted.

(1) A referred document supplements information included in a referring document. For example, this feature includes a case where a referred document is a regulation and a referring document is an addition to the regulation. This feature also includes a case where a reference document is about the discovery of a star and a referring document is about new data, hypothesis, etc., on the star.

(2) A referred document summarizes information on the field of a referring document. Such a referred document corresponds to a so-called thesis review, which is often cited in order to show the recent development of the relevant field.

(3) A referred document is argued against by a referring document.

(4) A referred document is a typical document written by a person who is mentioned in a referring document.

The positioning in the relevant field of a referred document can be obtained by processing a lot of documents in this way.

FIG. 2B shows the configuration of a reference reason identifying apparatus. The reference reason identifying apparatus shown in FIG. 2B comprises an input interface 21, a document structure analysis unit 22, a bibliographical information analysis unit 23, a text structure analysis unit 24, a reference document information analysis unit 25, a reference context analysis unit 26, a correspondence identification unit 27, an output generation unit 28 and an output interface unit 29.

First, the input interface 21 inputs document data 30 as text data. The document structure analysis unit 22 divides the inputted text data into three parts, which are a bibliographical information part, a text (body) part and a reference document part, and inputs the three parts to the bibliographical information analysis unit 23, text structure analysis unit 24 and reference document analysis unit 25, respectively.

Then, the bibliographical information analysis unit 23 extracts document information, such as a title, an author name, etc., from the bibliographical information part and outputs the data. The text structure analysis unit 24 extracts both a chapter structure and a part where a reference document is cited from the text part and outputs the data. The reference document analysis unit 25 extracts document information, such as an author name, date of issuance, title, journal name, etc., from the description of the reference document part.

Then, the reference context analysis unit 26 analyzes a part where a reference document is cited in the text information, identifies a reference reason and outputs the reason. The correspondence identification unit 27 relates the part where the reference document is cited in the text part to the document information extracted from the description of the reference document part and outputs the correspondence.

Then, the output generation unit 28 combines the document information outputted from the bibliographical information analysis unit 23, the reference reason outputted from the reference context analysis unit 26, the correspondence information outputted from the correspondence identification unit 27 and the document information of the reference document outputted from the reference document analysis unit 25 into output data 31 and inputs the data to the output interface 29.

Then, the output interface 29 outputs the output data 31 to a display screen, etc. The output data 31 include, for example, the title of the document data 30 and a list of the combinations of a reference document and a reference correlation.

Next, the detailed process of the reference reason identifying apparatus shown in FIG. 2B is described with reference to FIGS. 3 through 9.

Figure 3:
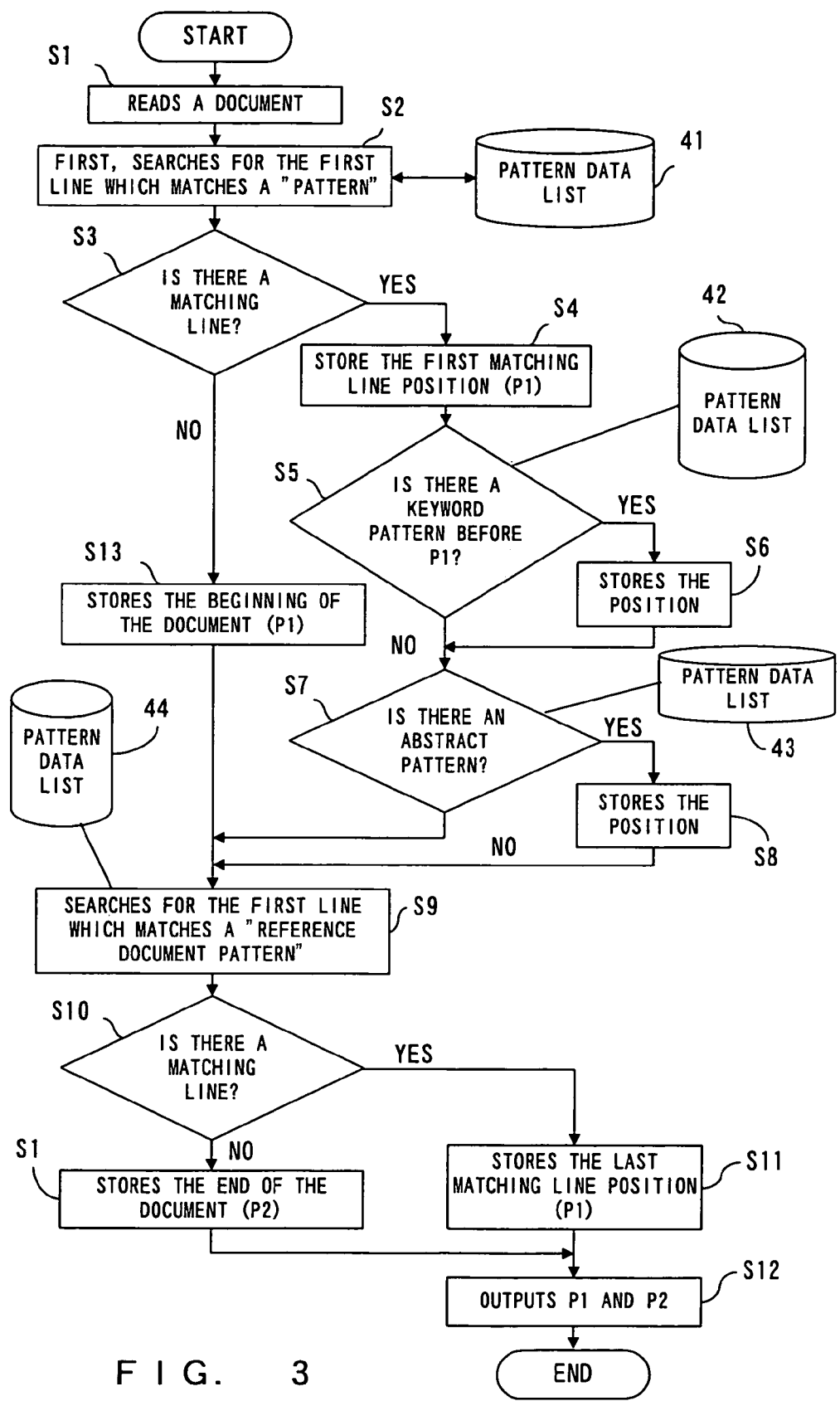
FIG. 3 is a flowchart showing the process of a document structure analysis unit.

FIG. 3 is a flowchart showing the process of the document structure analysis unit 22. Pattern data lists 41, 42, 43 and 44 contain information about pre-determined character string patterns and are stored in a storage device, which is not shown in FIG. 3.

The document structure analysis unit 22 first reads the text data of a document (step S1), searches for a line including a matching pattern while referring to an introductory pattern (introduction pattern) stored in the pattern data list 41 (step S2) and checks whether there is such a line in the text data (step S3). If a document is written in English or Japanese, for example, the following character strings are stored in the pattern data list 41 as the introductory pattern.

1 Introduction

1. Introduction

Introduction or

1はじめに

1.はじめに

はじめに

1背景

概要

If there is a line which matches such a pattern, the document structure analysis unit 22 stores the first matching line position as P1 (step S4). Then, the document structure analysis unit 22 checks whether there is a keyword pattern before the position P1 while referring to keyword patterns stored in the pattern data list 42 (step S5). As the keyword pattern, for example, the following character strings are stored in the pattern data list 42 if "***" is assumed to be an arbitrary keyword.

keyword *** keyword: *** or

キーワード***

キーワード***

If there is a line which matches such a pattern, the document structure analysis unit 22 stores the position (step S6). Then, the document structure analysis unit 22 checks whether there is an abstract pattern before the stored position while referring to abstract patterns stored in the pattern data list 43 (step S7). As the abstract pattern, for example, the following pattern information is stored in the pattern data list 43.

Abstract

A sentence of 20 words or more, which is not positioned at the beginning of a document If there is a line which matches such a pattern, the document structure analysis unit 22 stores the position (step S8). Then, the document structure analysis unit 22 searches for a line containing a matching pattern while referring to reference patterns stored in the pattern data list 44 (step S9) and checks whether there is such a line after the position P1 (step S10). As the reference document pattern, for example, the following pattern information is stored in the pattern data list 44.

Reference or

参照文献

参考文献

If there is a line which matches such a pattern, the document structure analysis unit 22 stores the position of the last matching line as P2 (step S11), outputs the stored positions P1 and P2 (step S12) and terminates the process. If in step S5 there is no keyword pattern, the document structure analysis unit 22 performs the processes in and after step S7 without storing a position. If in step S7 there is no abstract pattern, the document structure analysis unit 22 performs the processes in and after step S9 without storing a position.

If in step S3 there is no introductory pattern, the document structure analysis unit 22 stores the start position of the document as P1 (step S13) and performs the processes in and after step S9. If in step S10 there is no reference document pattern, the document structure analysis unit 22 stores the end position of the document as P2 (step S14) and performs the process in step S12.

The position P1 which is outputted in step S12 corresponds to the boundary position (break) between the description of the bibliographical information part and the description of the text part, and the position P2 corresponds to the boundary position between the description of the text part and the description of the reference document part.

FIG. 4 is a flowchart showing the process of the bibliographical information analysis unit 23. Both a stop word list 51 and a pattern data list 52 contain information about pre-determined character string patterns and are stored in the storage device.

The bibliographical information analysis unit 23 first reads a part ranging from the beginning of the text data to P1 as the bibliographical information part (step S21), and checks the text data while referring to the stop word list 51. If there is a sentence containing a stop word at the beginning of the text data, the bibliographical information analysis unit 23 skips the sentence (step S22), and extracts the next sentence as a title (step S23). For the stop word, a character string that may appear at the beginning of a sentence which is not a title is used, and, for example, the following character strings are stored in the stop word list 51.

解説

技術メモ or

Technical Note

Then, the bibliographical information analysis unit 23 searches for and extracts a matching pattern from a sentence immediately after the sentence stored as a title while referring to the patterns of an author name stored in the pattern data list 52 (step S24). For the pattern of an author name, for example, pattern information shown in FIG. 4 is stored in the pattern data list 52. In FIG. 4, "00" indicates an author name registered in a dictionary, and "- - - - -" indicates an unknown word that is not registered in the dictionary. These patterns of an author name can also be expressed as follows.

Author name+unknown word

Unknown word+unknown word

Alphabet. author name

Alphabet. unknown word

Alphabet. alphabet. author name

Alphabet. alphabet. unknown word

Then, the bibliographical information analysis unit 23 writes the extracted data in the storage device as a title and an author name (step S25) and terminates the process.

Figure 5:
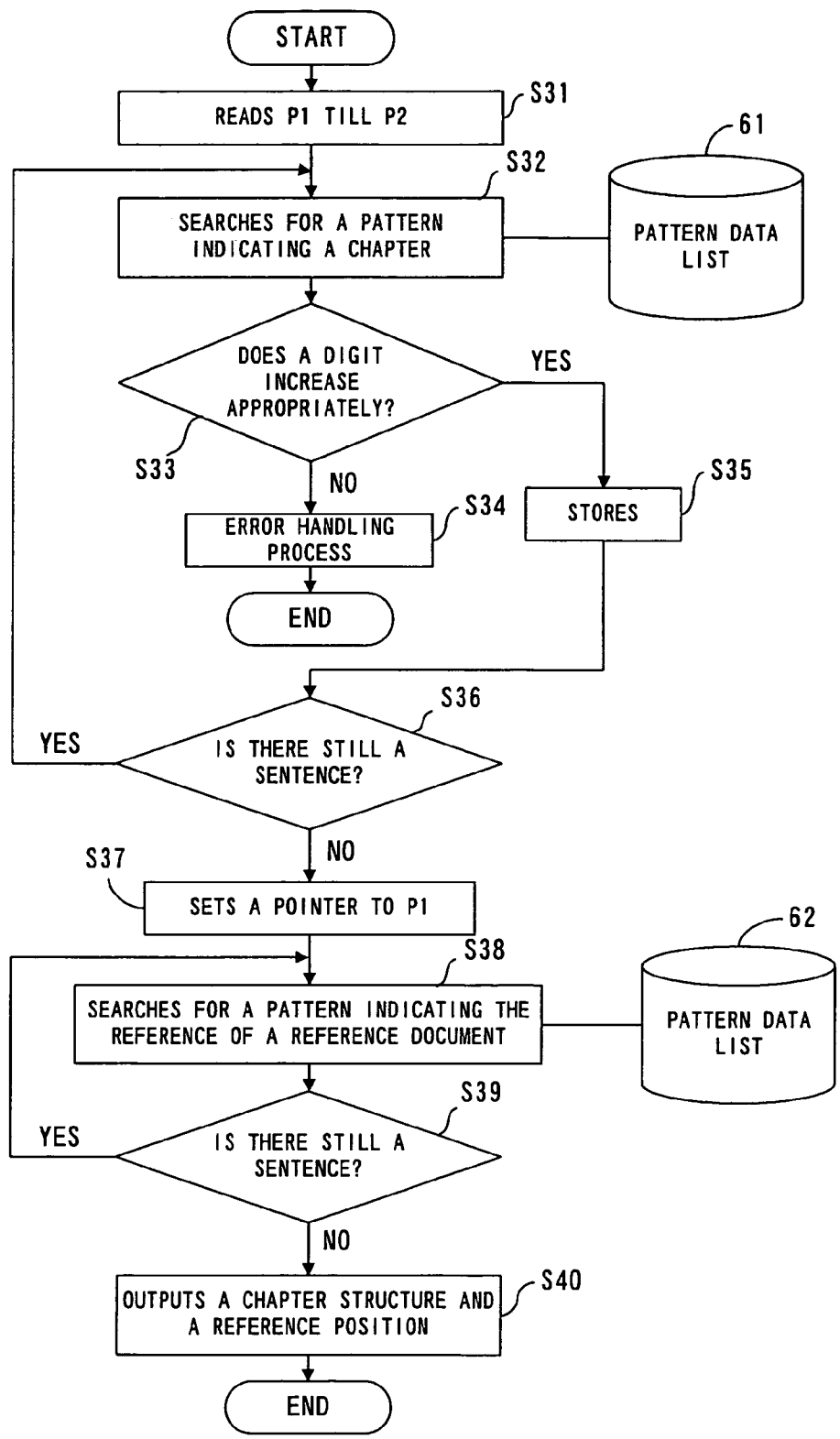
FIG. 5 is a flowchart showing the process of a text structure analysis unit.

FIG. 5 is a flowchart showing the process of the text structure analysis unit 24. Pattern data lists 61 and 62 contain information about pre-determined character strings and are stored in the storage device.

The text structure analysis unit 24 searches for a pattern indicating chapter structure in the text inputted by the document structure analysis unit 22 sequentially from the beginning and repeats the process of storing the position of such a pattern until there is no such pattern. Then, the text structure analysis unit 24 returns to the beginning of the text, searches for a pattern indicating a reference document and repeats the process of storing the position of such a pattern until there is no such pattern. Lastly, the text structure analysis unit 24 outputs both the obtained chapter structure and the reference positions of reference documents.

The text structure analysis unit 24 first reads a part ranging from P1 to P2 of the text data as the text part (step S31), and searches for a pattern indicating chapter structure while referring to the pattern data list 61 (step S32). As the pattern of chapter structure, for example, the following pieces of pattern information are stored in the pattern data list 61, and lines which match these patterns are searched for.

Numerals character string (carriage return)

Numerals. character string (carriage return)

In these examples, the numerals at the beginning of a pattern indicates a chapter number, and usually it increases as the text data are read. If the size, thickness, etc., of a character are known in advance, the pattern of a chapter structure can be searched for referring to these pieces of information.

Then, the text structure analysis unit 24 checks whether the numerals contained in a searched pattern increase appropriately (step S33). For example, if the numerals do not consecutively increase, the text structure analysis unit 24 judges that the numerals do not increase appropriately, performs an error handling process (step S34), and terminates the process.

If the numerals increase appropriately, the text structure analysis unit 24 stores the position of the searched pattern as the start position of a new chapter (step S35), and checks whether there is a sentence remaining (step S36). If there is a sentence remaining, the processes in and after step S32 are repeated until there is no sentence remaining.

If there is no sentence remaining, then the text structure analysis unit 24 sets a pointer to position P1 (step S37), searches for a pattern indicating that a reference document is cited while referring to the pattern data list 62 (step S38). As the pattern indicating that a reference document is cited, for example, the following pieces of pattern information are stored in the pattern data list 62.

Numerals)

[numerals]

[character string name of era]

Character string name of era

If a part which matches any of these patterns has been searched for, the text structure analysis unit 24 stores the position as a reference position, and checks whether there is a sentence remaining (step S39). If there is a sentence remaining, the process in step S38 is repeated until there is no sentence remaining. If there is no sentence remaining, the text structure analysis unit 24 outputs both the obtained start position of each chapter and the reference positions (step S40) and terminates the process.

Figure 6:
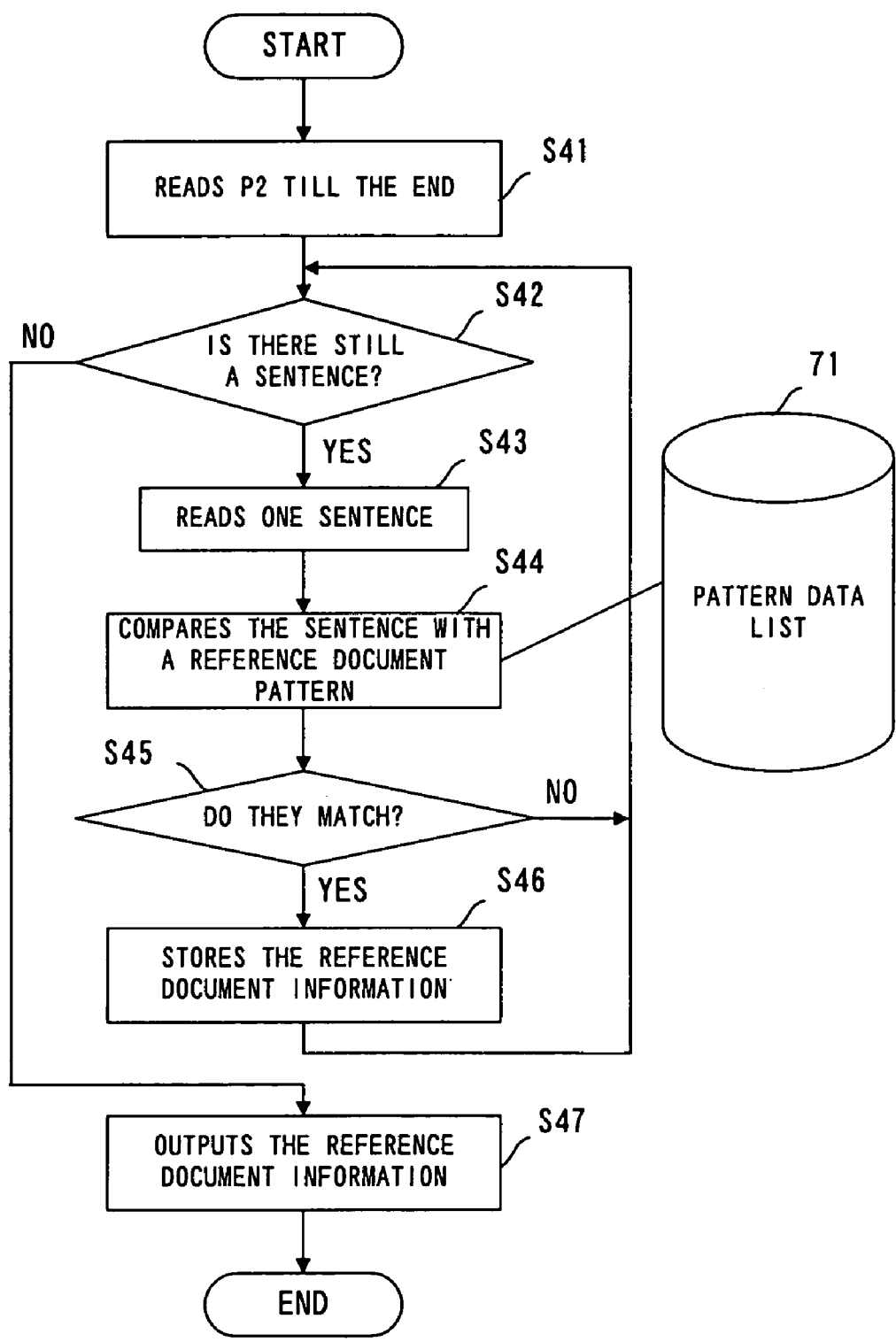
FIG. 6 is a flowchart showing the process of a reference document analysis unit.

FIG. 6 is a flowchart showing the process of the reference document analysis unit 25. A pattern data list 71 contains information about pre-determined character string patterns and is stored in the storage device.

The reference document analysis unit 25 reads the reference document part inputted from the document structure analysis unit 22 one sentence at a time and sequentially stores information, such as the matched author name, date of issuance, title, journal name, etc. The reference document analysis unit 25 repeats such a process until there is no line remaining in the reference document part.

The reference document analysis unit 25 first reads a part ranging from P2 to the end of the text data as the reference document part (step S41), and checks whether there is a sentence remaining(step S42). If there is a sentence remaining, the reference document analysis unit 25 reads one sentence (step S43), compares the sentence with the reference document pattern of the pattern data list 71 (step S44) and checks whether there is a matching pattern (step S45). As the reference document pattern, for example, the following pieces of pattern information are stored in the pattern data list 71.

Author name and author name era name "title" journal name

[author name era name] author name era name "title" journal name

[reference number] author name era name "title" journal name

If the read sentence matches such a pattern, the reference document analysis unit 25 stores information, such as the author name, era name, journal name, etc., contained in the sentence as reference document information (step S46) and repeats the processes in and after step S42. If there in no matching pattern, the reference document analysis unit 25 repeats the processes in and after step S42 without storing information contained in the sentence. If in step S42 there is no sentence remaining, the reference document analysis unit 25 outputs the obtained reference document information (step S47) and terminates the process.

Figure 7:
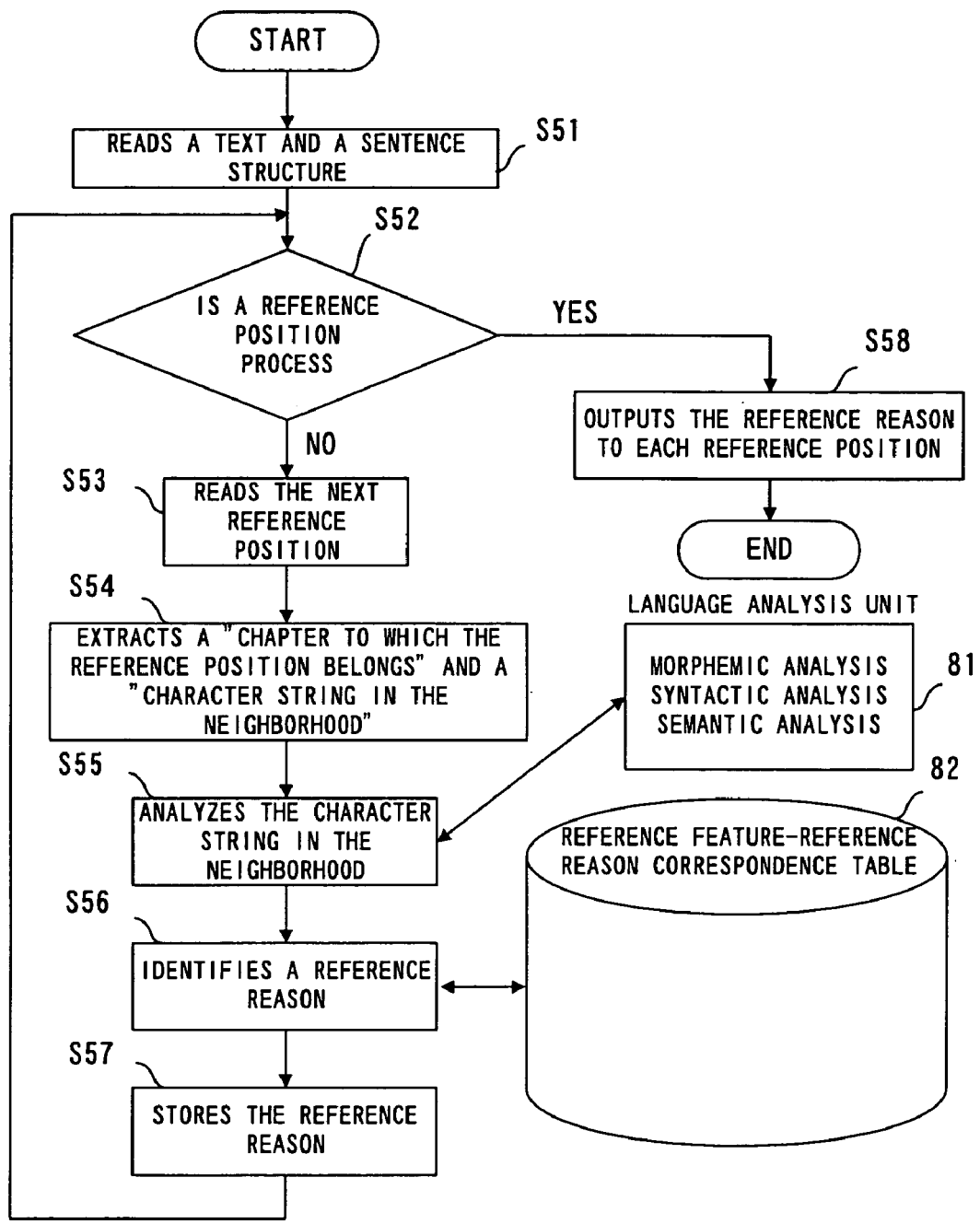
FIG. 7 is a flowchart showing the process of a reference context analysis unit.

FIG. 7 is a flowchart showing the process of the reference context analysis unit 26. The pattern data list 71 contains information about pre-determined character string patterns and is stored in the storage device.

The reference context analysis unit 26 includes a language analysis unit 81 and a reference feature/reference reason correspondence table 82, analyzes information about both chapter structure and reference position inputted from the text structure analysis unit 24 and identifies a reference reason. This reference feature/reference reason correspondence table 82 is prepared in advance by a human being or by machine learning. The reference context analysis unit 26 identifies the reference reason for each reference position based on three pieces of information: the information of a chapter containing the position, the result of the analysis of a character string in the neighborhood of the position by the language analysis unit 81 and the reference pattern of a reference document using the reference feature/reference reason correspondence table 82.

The reference context analysis unit 26 first reads the text and its chapter structure (step S51) and checks whether all the processes of all reference positions are completed (step S52). If all the processes are not completed yet, the reference context analysis unit 26 reads the next reference position (step S53) and extracts both the number of a chapter to which the position belongs and a character string in the neighborhood of the position while referring to the chapter structure (step S54).

Then, the language analysis unit 81 makes the morphemic analysis, syntactic analysis, semantic analysis, etc., of the extracted character string and extracts the features of the neighborhood of the reference position (step S55). For example, for the morphemic analysis, the algorithm described on pages 117–137 of the following document [1] is used, and for the syntactic analysis, the algorithm described on pages 140–199 of the document is used. For the semantic analysis, the algorithm described on pages 200–231 is used.

[1] Makoto Nagao, "Natural Language Processing", Iwanami Shoten (1996)

Then, the reference context analysis unit 26 identifies a reference reason while referring to the reference feature/ reference reason correspondence table 82 (step S56). As the reference reason, for example, the following reasons are considered.

(1) Answer

A reference document is cited in order to describe an opinion different from the content of the reference document.

(2) Application

A reference document is cited in order to introduce the application field.

(3) Basic

A reference document is cited in order to introduce a basic research or the work of his or her predecessor.

(4) Contraposition

A reference document is cited in order to introduce an opinion against a specific part of the content or a contrasting opinion.

(5) Human

A reference document is cited in order to introduce the typical document of a specific person.

(6) Related work

A reference document is cited in order to introduce a work related to a specific content.

(7) Review

A reference document is cited in order to introduce the review of a specific field.

(8) Software

A reference document is cited in order to introduce software used in a simulation, etc.

(9) Technique

A reference document is cited in order to introduce a technique used in an experiment, simulation, etc.

(10) Weak correlation

A reference document is cited in order to introduce a content which has a weak correlation to a specific content.

(11) Similar

A reference document is cited in order to introduce a content similar to a specific content.

The reference feature/reference reason correspondence table 82 stores a correspondence between the category of such a reference reason and a reference feature. This reference feature indicates the feature of the description method of a text expressing a corresponding reference reason and includes information, such as the number of the chapter containing the reference position of a reference document, the context of a character string in the neighborhood of the reference position, the reference pattern of the reference document, etc. In the case of the reference reasons described above, the following pieces of correspondence are stored in the reference feature/reference reason correspondence table 82 if "**" is assumed to be a character string indicating a reference document.

Reference position=Chapter 1 and Result of language analysis=negative expression→Answer Context="Although . . .  is popular, in this study . . ." →Answer Context="This approach is used in  . . ." →Application Reference position=Chapter 1 or 2→Basic Context="The first idea . . . due to " or "In previous research . . . " →Basic Context="Unlike previous . . . , new . . ." →Contraposition Reference position=Chapter 1 and Context=" in which . . . has been proposed" or " in which . . . is proposed" →Related work Context=" . . . is reviewed in ", " reviewed" or "see  for an overview" →Review Context="We use . . . similar to ", "see  for a similar . . . approach" or " . . . is also implemented in **" →Similar The reference context analysis unit 26 retrieves the reference feature/reference reason correspondence table 82 using the information extracted in step S54 or the analysis result obtained in step S55 as a reference feature, acquires a corresponding reference reason and stores the reason (step S57). Then, the reference context analysis unit 26 repeats the processes in and after step S52. If in step S52 the processes of all reference positions are completed, the reference context analysis unit 26 outputs a reference reason for each reference position (step S58) and terminates the process.

As described above, a reference reason is identified based on the features of an expression relating to a referred document in a referring document. For this method of identifying a reference reason, a statistical method can also be used in addition to the method of storing the reference feature/reference reason correspondence table 82 described above. Such a method is also known as "machine learning". In this case, for the reference feature, the following features are used.

(1) Appearance frequency of a reference document (2) Reference position of a reference document: distance from the beginning of a document, chapter of appearance (3) Neighborhood information of reference position: a cooccurring word, a phrase frequently used A reason why a referred document is cited is prepared in advance as a correct answer for each of these reference features by a human being, and the reference feature extracted by a machine or human being is related to the reference reason. In this case, a plurality of sets consisting of a reference feature and a reference reason are prepared and a reference feature is related to a reference reason using a statistical method. For the statistical method, for example, a decision tree, a neural net, the nearest neighborhood method, Bayesian inference, etc., which are described on pages 525–652 of the following document [2], are used.

[2] S. Russell and R. Norvig, "Agent Approach Artificial Intelligence", Kyoritsu Shuppan (1997)

Next, the operation of the reference reason identifying apparatus is described using a specific document as an example. FIG. 8 shows a document of "Jpn. J. Appl. Phys." in which a document of "Fujino" is cited as a reference document.

First, if this document is inputted via the input interface 21, the inputted data are divided into three parts of bibliographical information (Jpn.J.Appl. Phys . . . KEYWORDS; . . . ), a text (1 Introduction . . . ) and reference documents (Reference . . . K. Fujino, . . . ) by the document structure analysis unit 22.

In this example, the dividing points P1 and P2 shown in FIG. 3 are set, respectively, immediately before a line beginning with "1 Introduction" in Chapter 1 and immediately after a line beginning with "Reference". Therefore, lines from the beginning to a line immediately before "1 Introduction", Chapter 1 to Chapter 3 and lines after "Reference" correspond to the bibliographical information, the text and the reference documents, respectively.

The bibliographical information is analyzed by the bibliographical information analysis unit 23, and both the fact that the author of this document is Koji Tsukamoto et al., the fact that the title is "Morphology Evolution . . .", etc., are identified. The text is analyzed by the text structure analysis unit 24. As a result, the chapter structure is recognized and patterns, such as "6,8,10-13)" and "8,11,13)" are recognized as parts referring to reference documents in the text.

Such a recognition result is outputted to the reference context analysis unit 26, and a reference reason is identified based on in what chapter/sentence a reference document is cited. For example, if it is assumed that document 6) is cited four times and two times in Chapters 1 and 3, respectively, it is found that this document is cited relatively frequently. In this way, it is found that document 6) is an important document and is the base of the document shown in FIG. 8.

Since documents 6), 8) and 10–13) are cited with an expression, "Some methods have been . . . . However," it is found that these documents state opinions against the referring document. Since documents 8), 11) and 13) are cited with an expression, "Similar results were also reported . . .", it is found that these documents are similar to the referring document.

The reference document part is analyzed by the reference document analysis unit 25, and document information about reference documents is extracted. For example, it is recognized that the author of document 6) is "Fujino", that the document was issued in "1991" and that the document is printed by "J. Electrochem. Soc.".

Then, an expression "6)" indicating that document 6) is cited and the document information of document 6) is related by the correspondence identification unit 27. Then, all the pieces of information outputted by the bibliographical information analysis unit 23, reference context analysis unit 26, correspondence identification unit 27 and reference document analysis unit 25 are combined by the output generation unit 28 and are outputted from the output interface 29.

If a reference reason identified in this way is used, efficient retrieval can be implemented by retrieving a document using a reason indicating why a document is cited by another document.

Figure 9:
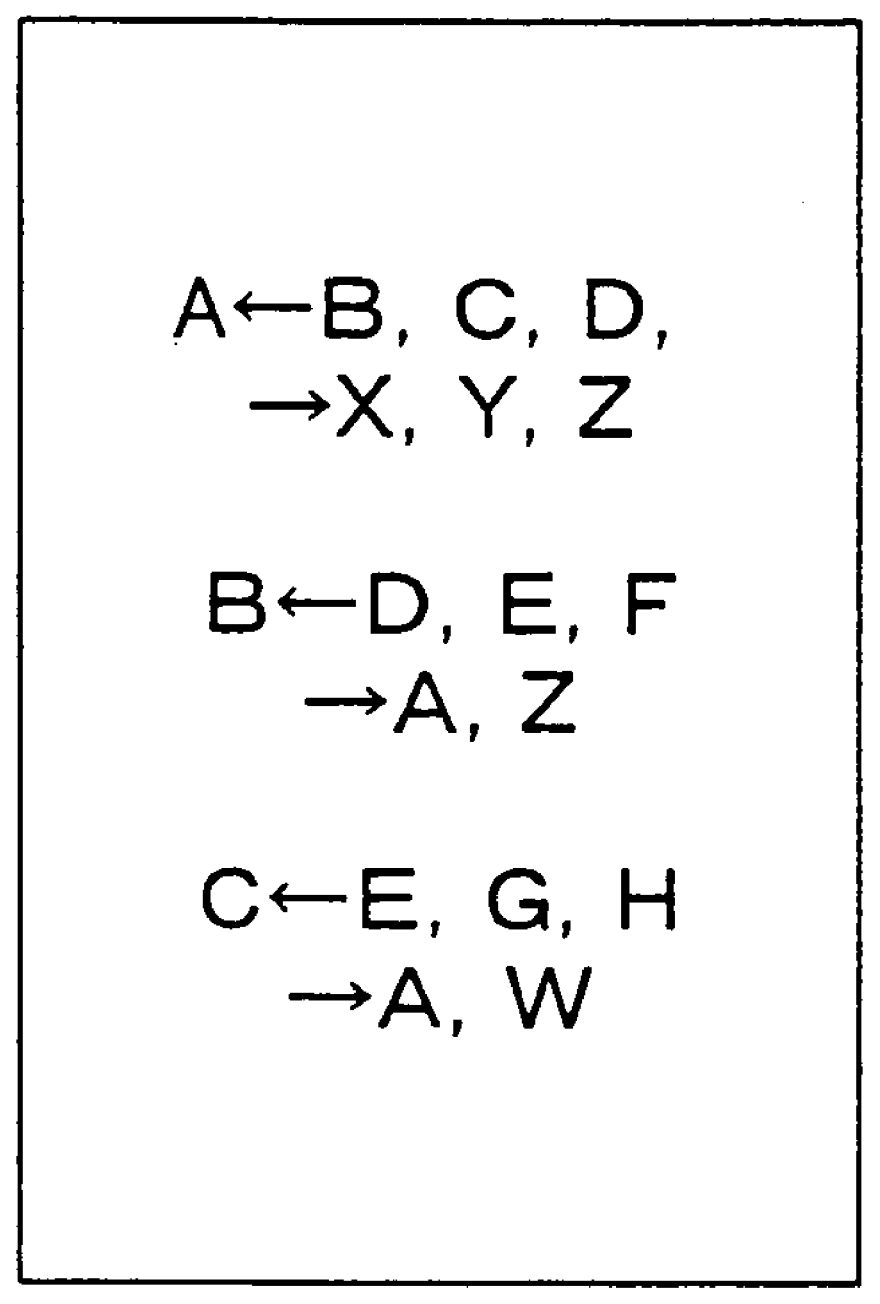

For example, FIG. 9 shows the data structure of a reference correlation obtained without using a reference reason. In this example, each alphabetical character indicates one document, and an arrowed document is cited by an arrowing document. However, FIG. 10 shows the data structure of a reference correlation obtained using a reference reason. In FIG. 10, not only referring/referred information between documents but also referring/referred information for each reference reason, are displayed.

Figure 11:
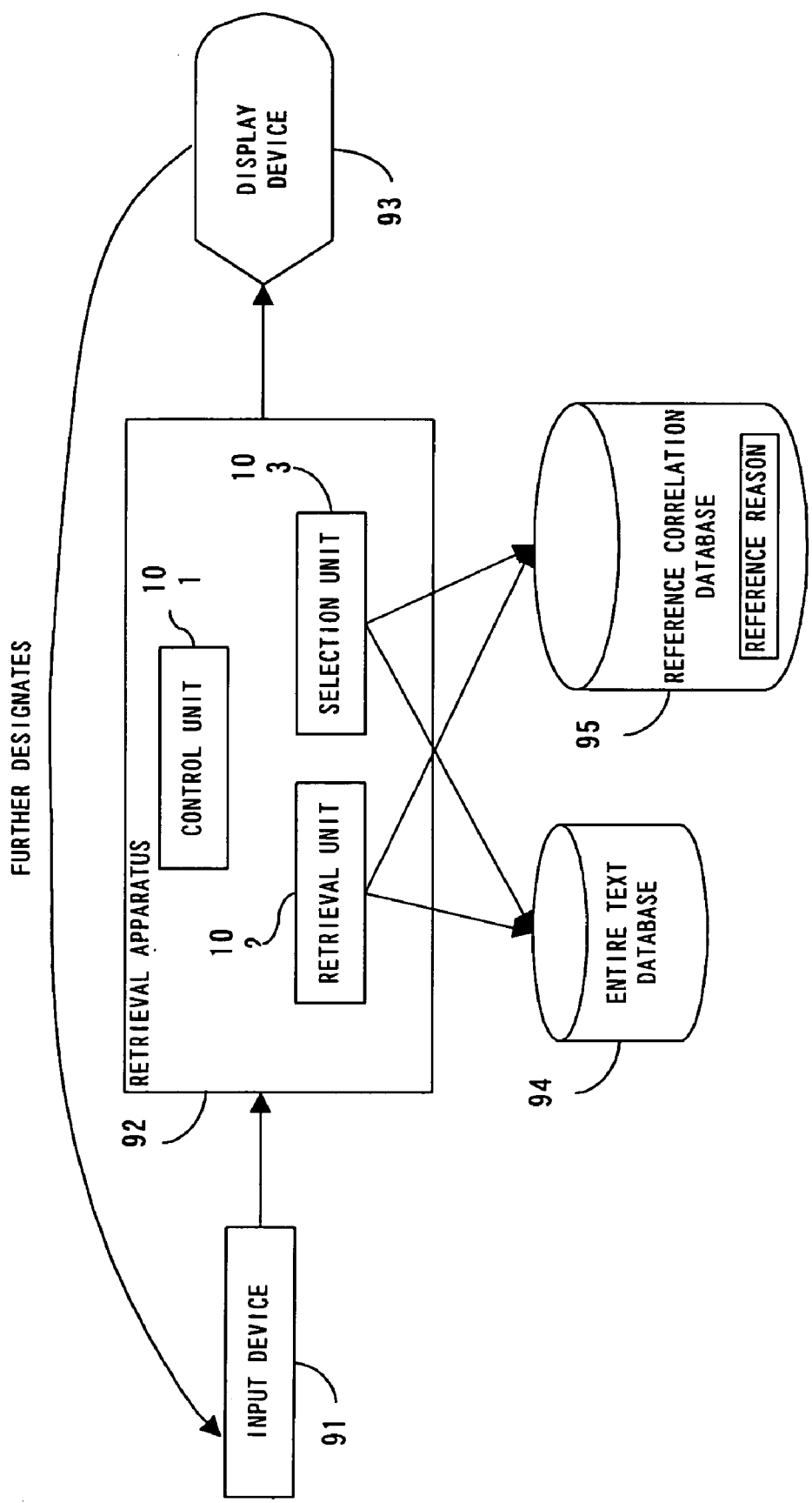
FIG. 11 shows the configuration of an information retrieval system.

FIG. 11 shows a system configuration adopted when referring/referred correlation using the reference reason is stored in the reference correlation database in the conventional information retrieval system shown in FIG. 27.

An information retrieval system shown in FIG. 11 comprises an input device 91, a retrieval device 92, a display device 93, a full text database 94 and a reference correlation database 95, and the retrieval device 92 includes a control unit 101, a retrieval unit 102 and a selection unit 103. The reference correlation database 95 stores the information extracted by the reference reason identifying apparatus shown in FIG. 2.

If a document is designated by the input device 91, the retrieval unit 102 retrieves the documents in the full text database 94 under the control of the control unit 101. Then, the selection unit 103 selects another document which has a common reference correlation to the designated document and another document which has made a similar reference as related documents using the reference correlation in the reference correlation database 95, and the display device 93 displays these related documents.

Figure 12:
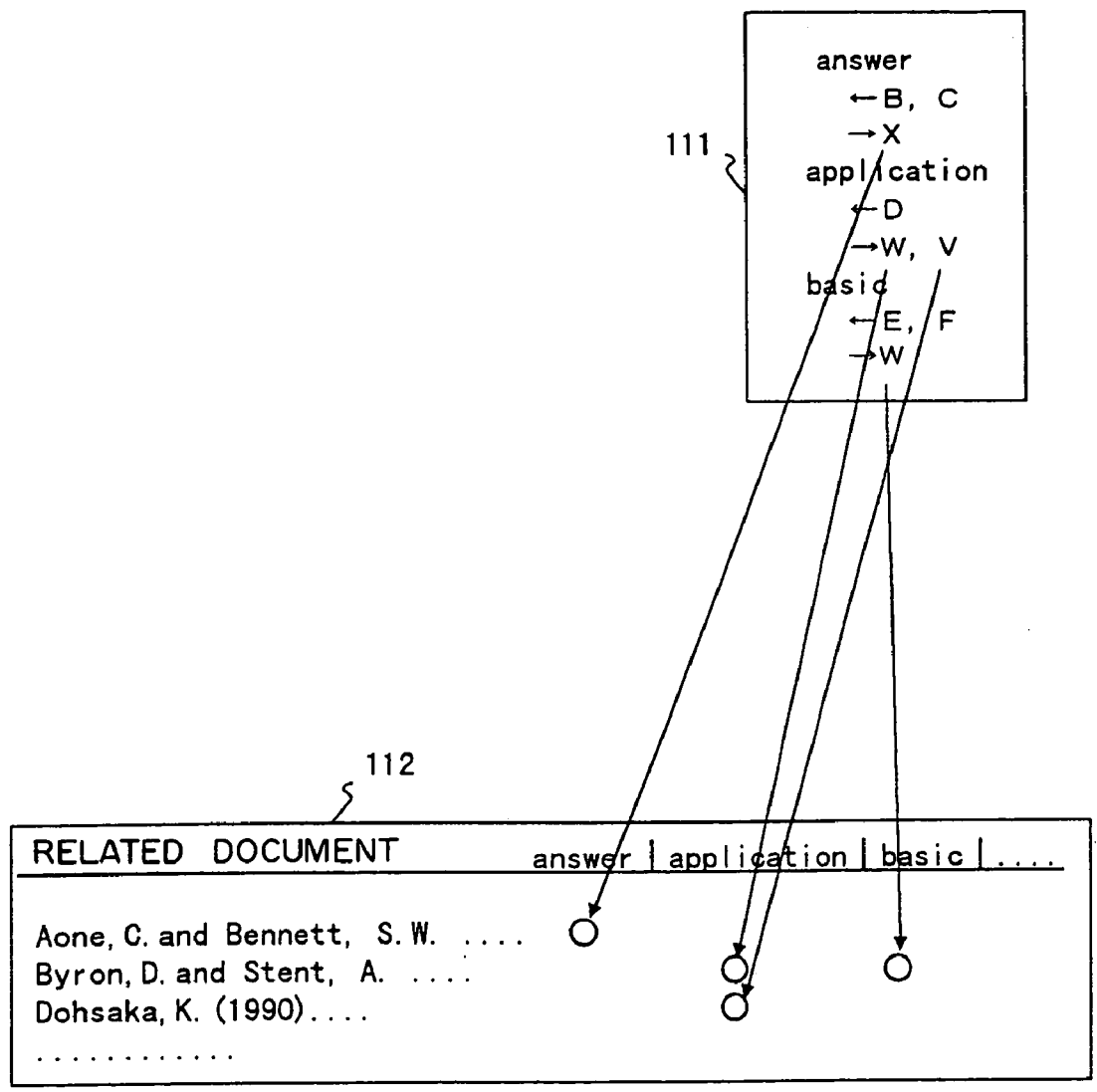
FIG. 12 shows the first display of the retrieval result.

FIG. 12 shows an example of the display of such a retrieval result. It is assumed that the reference correlation 111 of the designated document is stored in the reference correlation database 95 and documents X, W, V, etc., are selected as related documents. In this case, a retrieval result 112 is displayed on a screen of the display device 93, and a mark "0" is described in the corresponding reference reason column of each document. In this example, "answer", "application", "basic", etc., are presented as reasons why related documents are cited.

Figure 13:
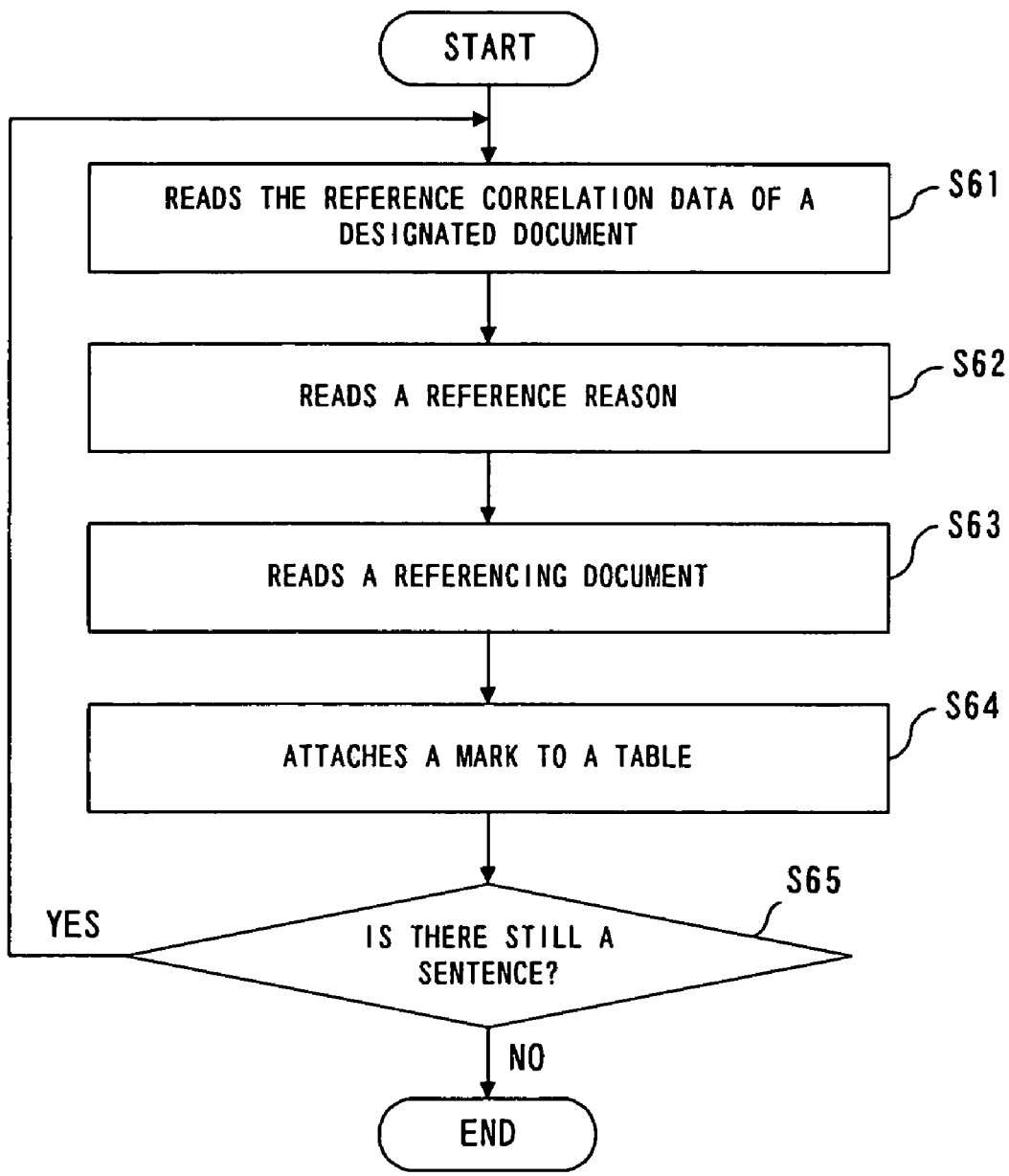
FIG. 13 is a flowchart showing a display process.

FIG. 13 is a flowchart showing the display process of a retrieval result obtained by the system shown in FIG. 11. The selection unit 103 first reads the reference correlation data of a designated document from the reference correlation database 95 (step S61) and reads a reference reason described in the data (step S62). Then, the selection unit 103 reads the document information of a referred document cited by the designated document, displays the retrieval result in a table format shown in FIG. 12 (step S63) and attaches a mark to a corresponding reference reason column (step S64).

Then, the selection unit 103 checks whether there are still reference correlation data, and if there are still data, the selection unit 103 repeats the processes in and after step S61. If all the reference correlation data of the designated document are processed, the selection unit 103 terminates the display process.

According to such a display process, when an important document related to a specific document is displayed, not only order based on a single criterion (reference frequency), as shown in FIG. 28, but also a reason indicating why the important documented is cited, is explicitly displayed. Therefore, the retrieval result can be further narrowed based on the reference reason and as a result, efficient document retrieval can be implemented.

Not only are related documents displayed in descending order of importance, but the related documents can also be classified according to each reference reason and can be displayed in descending order of importance, as shown in FIG. 14. In this case, the importance of each document can be determined by taking the following factors into consideration, in addition to the importance ranking based on the single criterion described above.

(1) Individual reference reason (2) Reference frequency for a corresponding reference reason (3) Importance of a referring document (4) Importance of a source (5) Reference frequency by a user If a user selects an appropriate reason among displayed reference reasons and retrieval is further designated, the retrieval unit 102 retrieves the full text database 94 while referring to the reference correlation database 95. Then, only a document cited for the designated reference reason is displayed as a related document.

As described above, according to the information retrieval system shown in FIG. 11, a user can improve the efficiency of the information retrieval by attaching a reference reason to a retrieval result or by making a retrieval using the reference reason.

Figure 15:
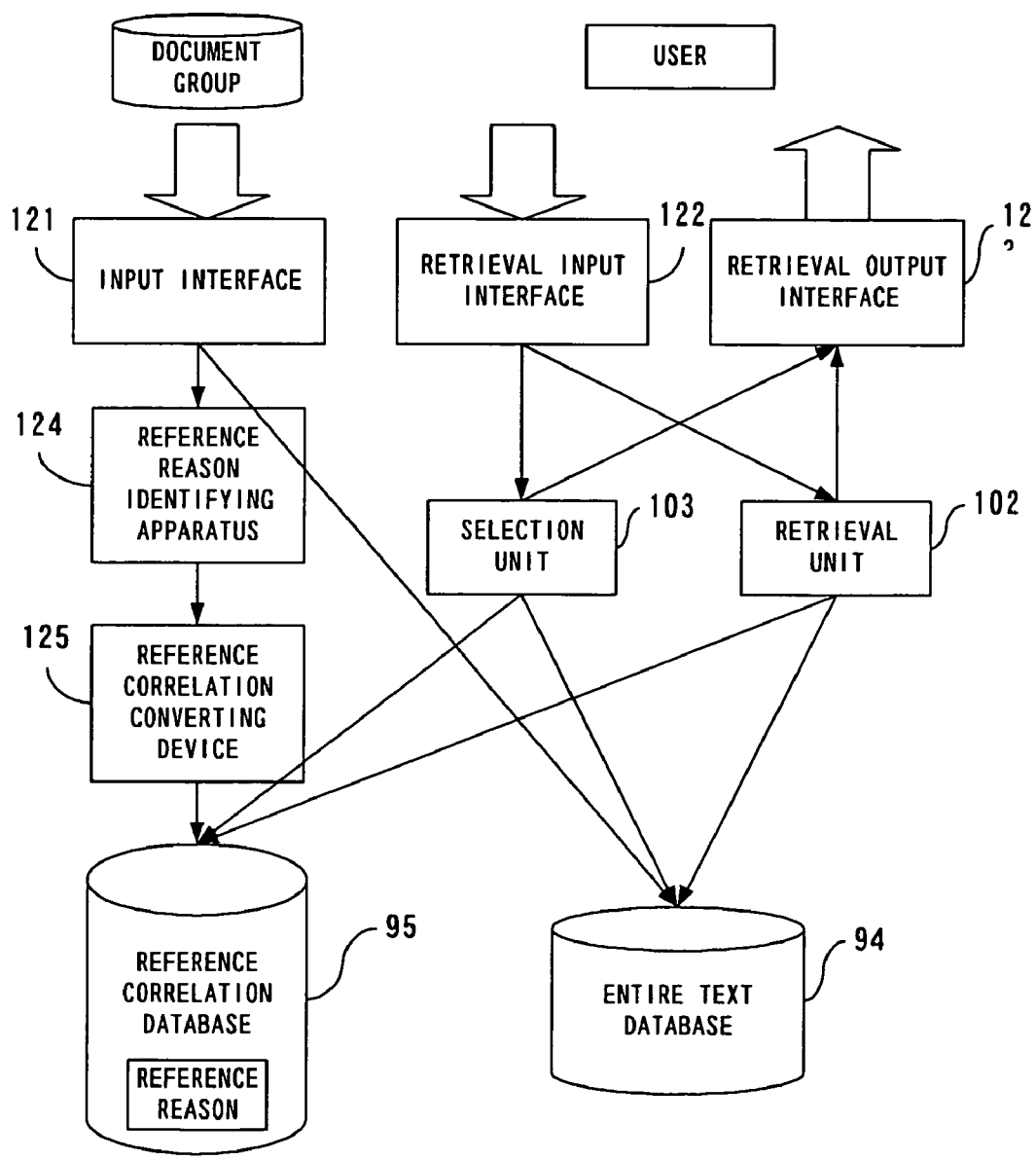
FIG. 15 shows the configuration of an information presenting apparatus.

Next, an information presenting apparatus for extracting and presenting information about a referred document is described. FIG. 15 shows the configuration of such an information presenting apparatus. An information presenting apparatus shown in FIG. 15 comprises an input interface 121, a retrieval input interface 122, a retrieval output interface 123, a reference reason identifying apparatus 124 and a reference correlation converting device 125 in addition to the constituent elements of the information retrieval system shown in FIG. 11.

The input interface 121 inputs a plurality of documents (a document group) by which a specific document is cited and stores the documents in the entire database 94. Simultaneously, the input interface 121 supplies the reference reason identifying apparatus 124 with the documents. The reference reason identifying apparatus 124 has the configuration as shown in FIG. 2B, calculates the reference correlation of a given document and outputs the reference correlation to the reference correlation converting device 125.

Figure 16:
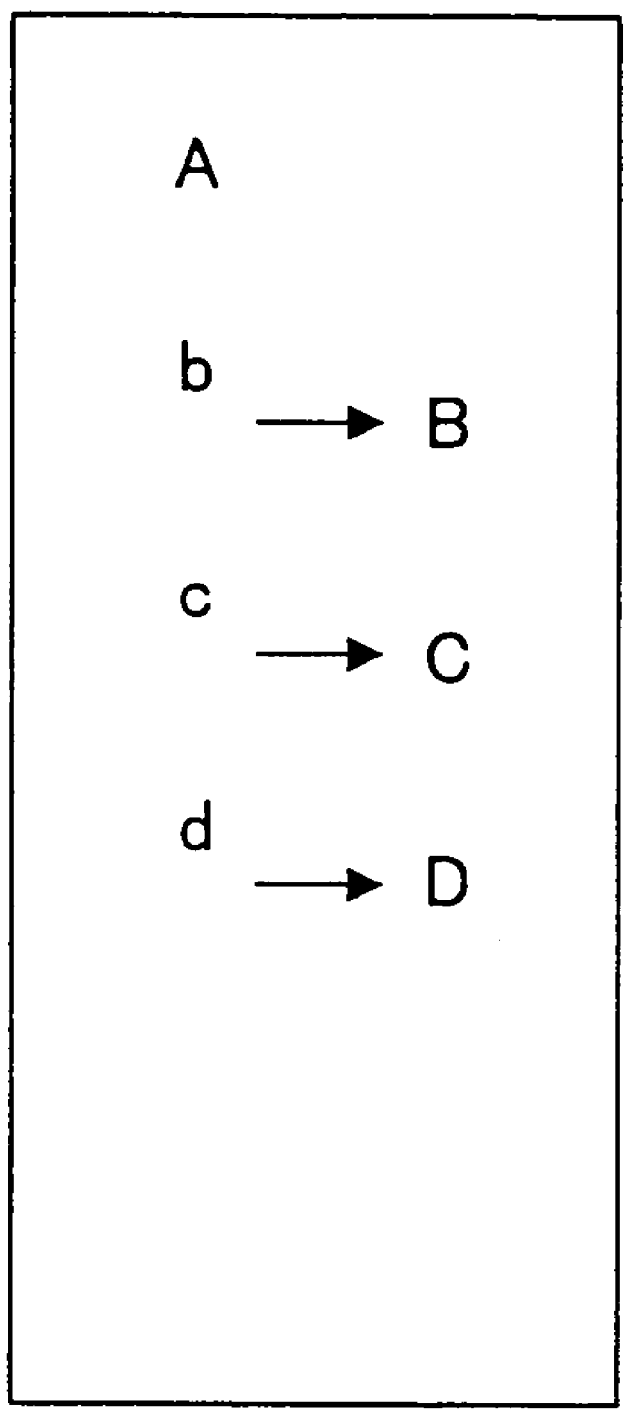
FIG. 16 shows the third reference correlation.
Figure 17:
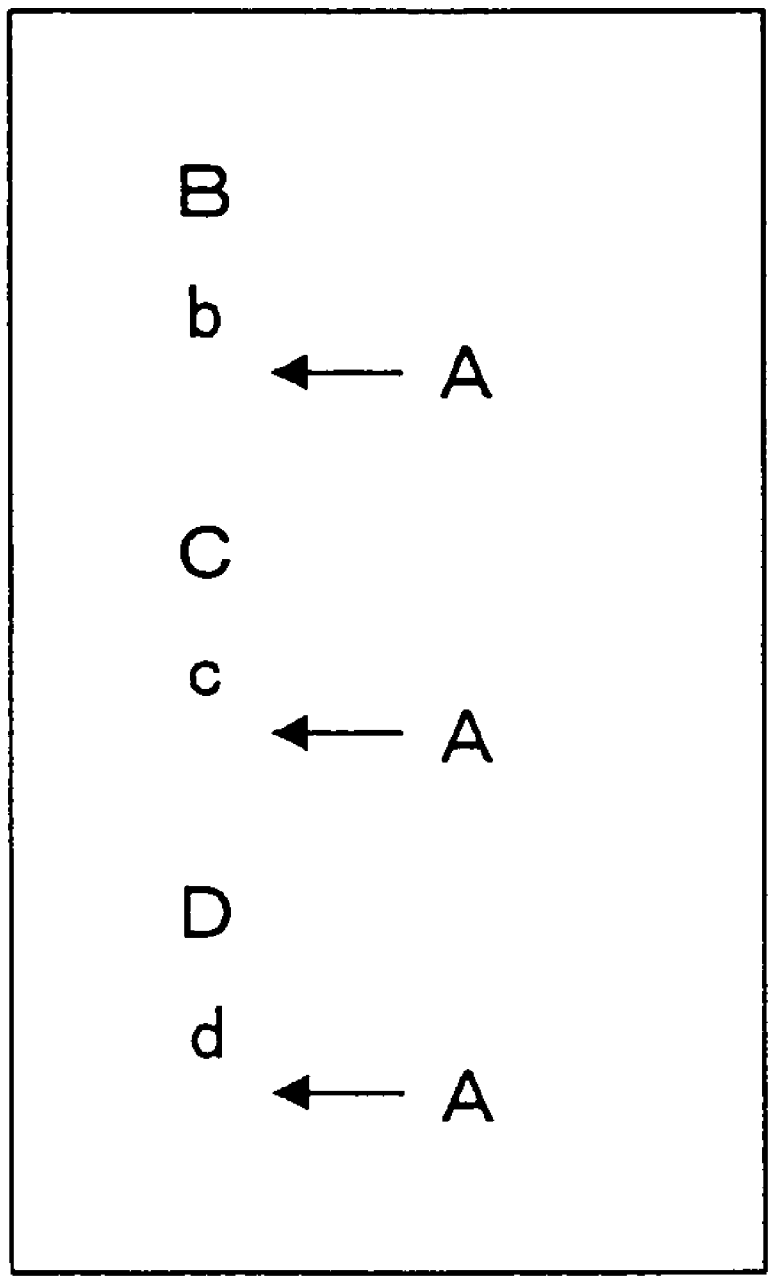
FIG. 17 shows the fourth reference correlation.
Figure 18:
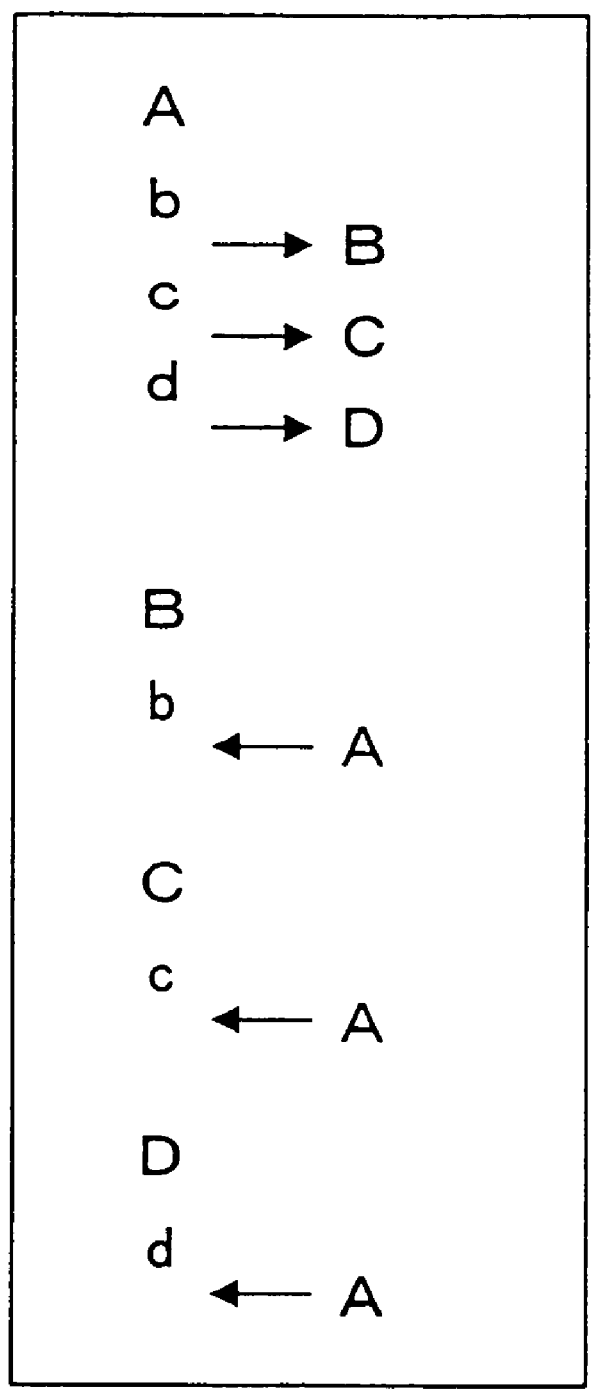
FIG. 18 shows the fifth reference correlation.

The reference correlation converting device 125 converts a given reference correlation and stores the converted correlation in the reference correlation database 95. For example, as shown in FIG. 16, a reference correlation where documents B, C and D are cited by a document A for reasons b, c and d, respectively, is assumed to be provided. In this case, as shown in FIG. 17, the reference correlation converting device 125 generates reference correlation data, as shown in FIG. 18, in addition to data indicating that documents B, C and D are cited by document A for the reasons b, c and d, respectively. Then, the reference correlation converting device 125 stores these pieces of data in the reference correlation database 95.

A user designates a keyword or document using the retrieval input interface 122 and conducts a retrieval. If information about a document obtained as the retrieval result is displayed by the retrieval output interface 123, the user further conducts a retrieval using the reference reason of the document.

In both the retrieval input interface 122 and retrieval output interface 123, the following inputs/outputs are made.

(1) If a user designates a document, the text of the document is displayed.

(2) An interesting reference correlation is used as a filter.

(3) A reference reason is explicitly displayed and a reference correlation is displayed.

(4) The reference correlation is graphically displayed using a GUI (graphical user interface) while explicitly displaying the reference reason, or changing the type of lines or arrows for indicating the reference correlation according to a reference reason.

Figure 19:
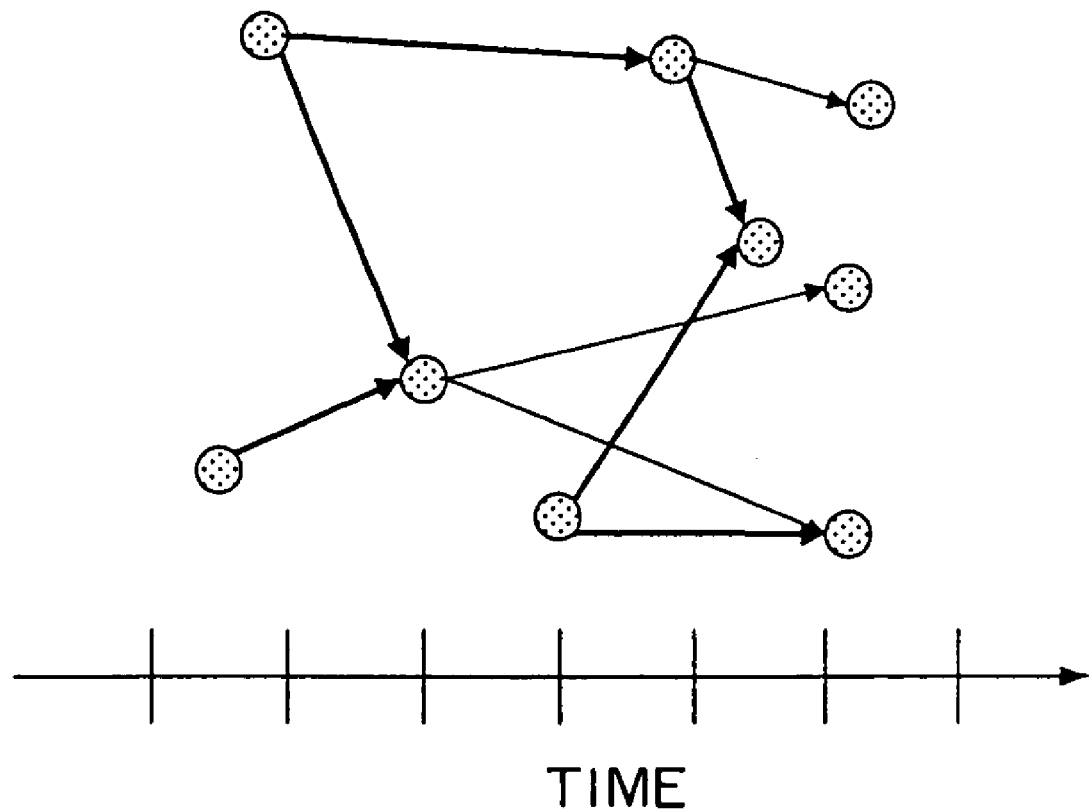
FIG. 19 shows the first time series.

For example, FIG. 19 shows a case where a plurality of documents are arrayed in issuance order and the reference correlations between documents are displayed using arrows. In this example, a circle indicates one document, and a plurality of documents are displayed in a time series along the time coordinate. A referring document and a referred document are connected by a line type different for each reference reason.

By using such a GUI, the positioning of each document in a complex reference correlation can be distinctly recognized and as a result, efficient document retrieval can be implemented. Furthermore, if the user designates a book mark in this display screen, the content of a corresponding document or the list of documents cited by the document can be displayed.

Although in FIG. 19, reference reasons are distinguished by the line type of an arrow, the reasons can be distinguished by the color of an arrow or can be displayed using a character string.

Figure 20:
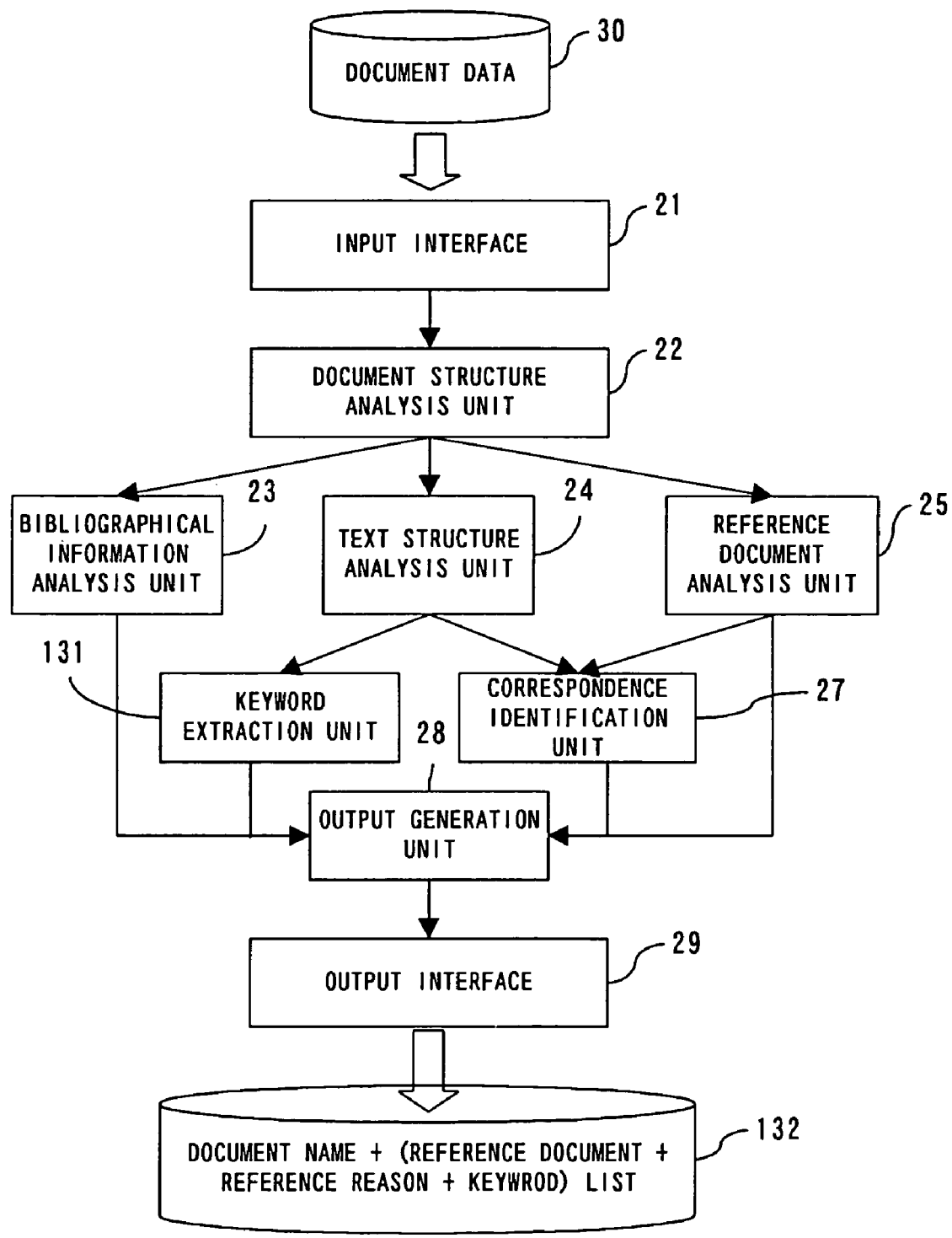
FIG. 20 shows the configuration of a keyword extraction apparatus.

Next, a keyword extraction apparatus using a reference correlation is described. FIG. 20 shows the configuration of such a keyword extraction apparatus. The keyword extraction apparatus shown in FIG. 20 further comprises a keyword extraction unit 131, in addition to the constituent elements of the reference reason identifying apparatus shown in FIG. 2B.

The text structure analysis unit 24 outputs an analysis result to the keyword extraction unit 131. The keyword extraction unit 131 extracts a keyword from a sentence in the neighborhood of a position where reference document is cited in the text, and outputs the keyword as the keyword of the reference document. In this case, output data 132 outputted from the output interface 29 include the combination list of the reference reason, reference correlation and keyword, in addition to the title of document data 30.

According to such a keyword extraction apparatus, not only a keyword selected by the author of a document, but also a keyword based on another document citing the document, are provided. Therefore, not only a subjective keyword, but also an objective keyword, can be provided.

Figure 21:
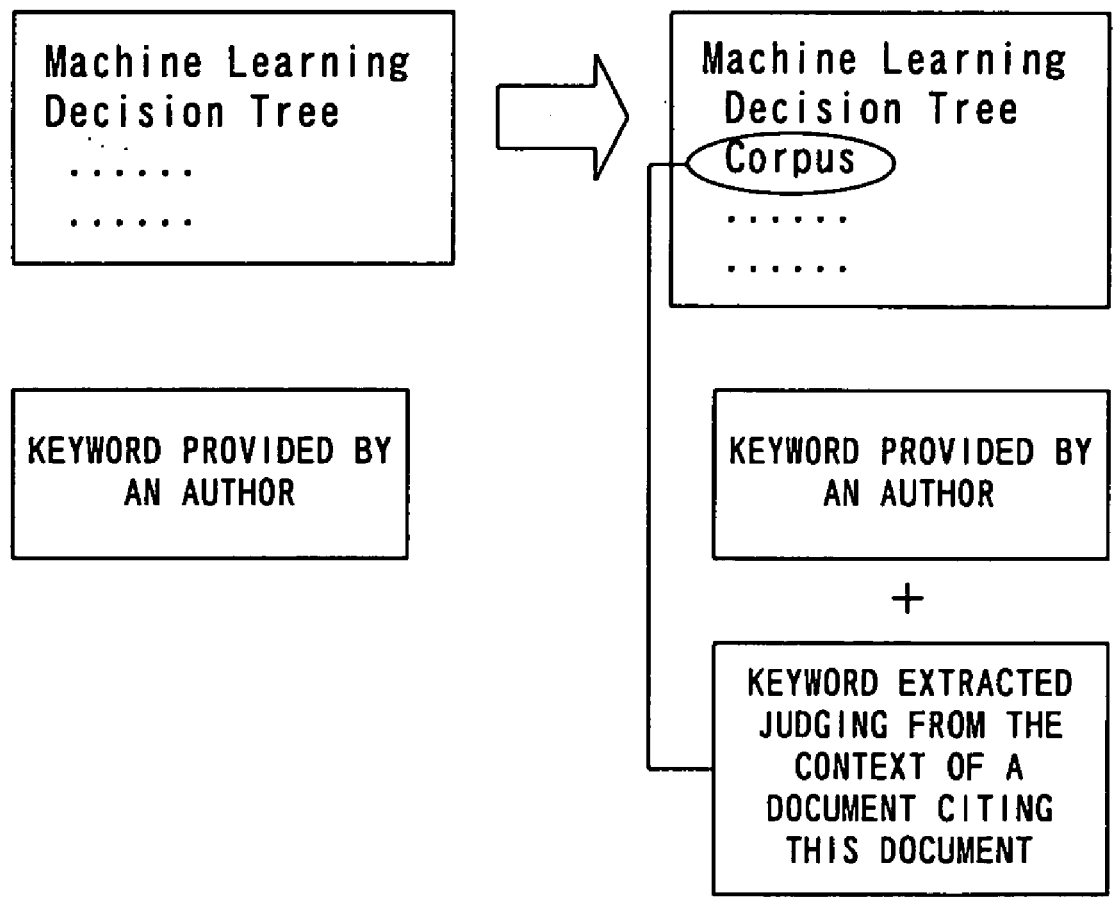
FIG. 21 shows a keyword using a reference correlation.

FIG. 21 shows an example of a keyword using such a reference correlation. In this example, "Machine Learning", "Decision Tree", etc., are provided as keywords by the author of a document, and a new keyword "Corpus" is extracted based on the context of another document citing the document and is added to the data structure of the keyword by the keyword extraction apparatus.

Figure 22:
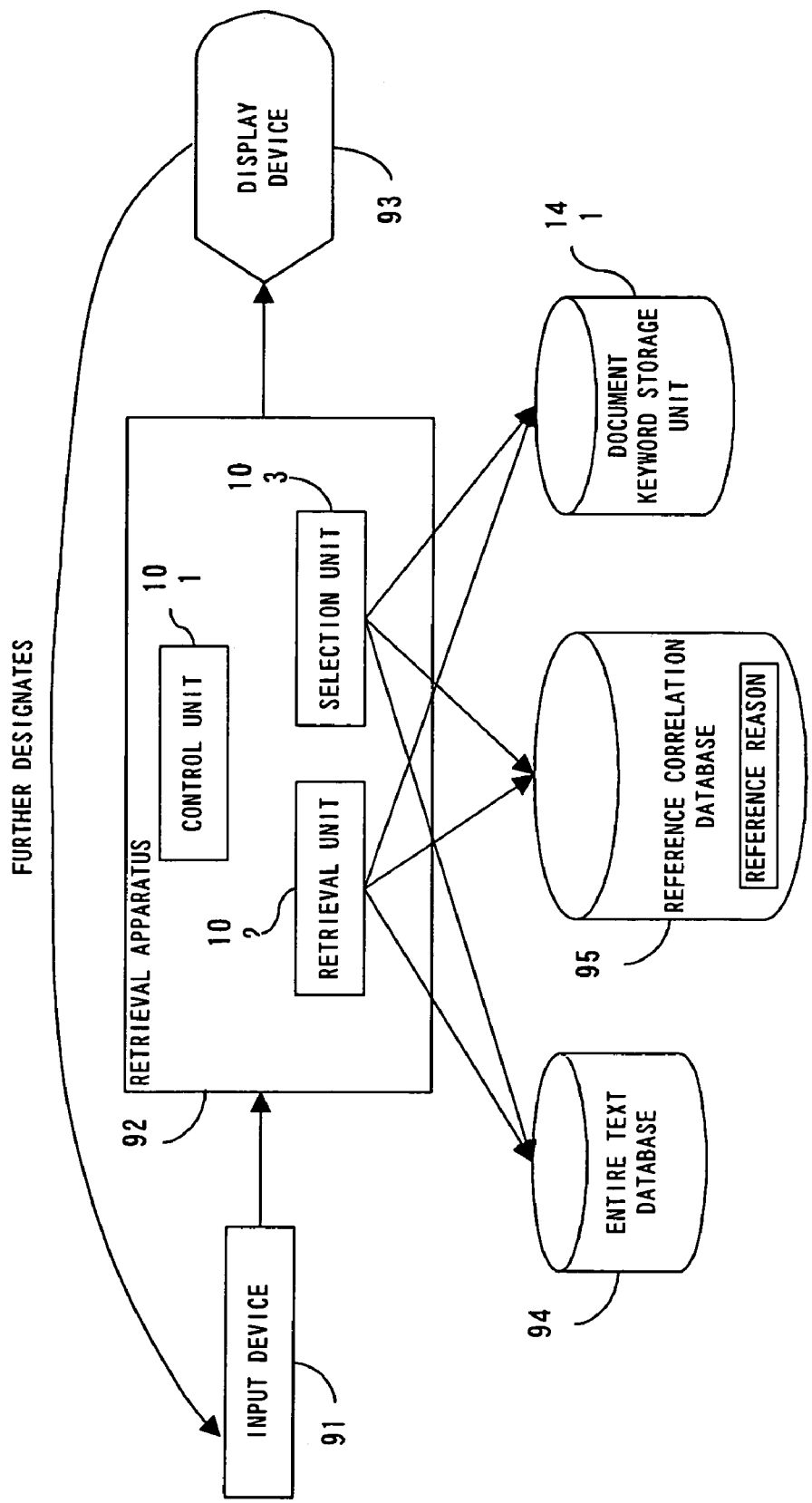
FIG. 22 shows retrieval using a keyword.

FIG. 22 shows an information retrieval system for retrieving a document using a keyword provided in this way. The information retrieval system shown in FIG. 22 further comprises a document keyword storage unit 141, in addition to the constituent elements shown in FIG. 11. The document keyword storage unit 141 stores keywords with which the document are provided in advance, and the reference correlation database 95 stores information extracted by the keyword extraction apparatus shown in FIG. 20.

The retrieval unit 102 retrieves documents in the entire database 94 while referring to keywords in both the document keyword storage unit 141 and reference correlation database 95. The selection unit 103 selects a related document using information in both the document keyword storage unit 141 and reference correlation database 95. In this case, the display priority is determined by taking into consideration the matching degree of a keyword, the importance calculated based on a reference correlation and the frequency a document is accessed.

According to such an information retrieval system, retrieval can be conducted using a keyword objectively provided by using a reference correlation in addition to a keyword provided in advance, and as a result, retrieval efficiency can be improved.

A plurality of documents can also be classified using a reference correlation between documents. FIG. 23 shows the configuration of a document classifying apparatus for classifying documents based on such a reference correlation. The document classifying apparatus shown in FIG. 23 comprises a reference correlation database 95, a keyword extraction apparatus 151 and a similarity identification device 152.

The keyword extraction apparatus 151 has a configuration as shown in FIG. 20, and extracts information, such as the reference correlation of a reference document, a keyword, etc., from a plurality of pieces of document data 153 and stores the information in the reference correlation database 95. The similarity identification device 152 compares reference correlations including reference reasons between inputted documents, performs clustering based on the similarity between reference correlations and outputs document clusters 154.

For example, if the similarity in reference correlation is calculated between documents a and b, the following equation is used.

$$\text{sim}(a, b) = \frac{1}{\sqrt{n_a} \sqrt{n_b}} \sum_i^{n_a} \sum_j^{n_b} \delta(r_{ai}, r_{bj})$$

In the equation, sim(a, b) indicates the similarity between documents a and b. na and nb are the numbers of referred documents cited by documents a and b, respectively. rai and rbj are vectors for indicating citations by documents a and b, respectively, and each of rai and rbj has the attributes of a referred document and the reference reason (i=1, 2, ..., na, j=1, 2, ..., nb).

δ(rai, rbj) is a function for indicating the similarity between rai and rbj. For example, it is defined in such a way that, if the same document is cited by both rai and rbj for the same reason, δ(rai, rbj)=1 is satisfied, and if this is not the case, δ(rai, rbj)=0 is satisfied. Alternatively, if the same document is cited by both rai and rbj for different reasons, 1 or 0.5 can be assigned to δ(rai, rbj).

As for referred documents, similarity is calculated by the same method, and the clustering of documents is performed based on the calculation result. In the document clustering, for example, the algorithm described on pages 436–438 of the document [1] described above is used. In this way, a plurality of documents of which the reference correlations are similar are classified into the same class. Clustering can also be performed by further adding the matching degree of a keyword, the appearance frequency of a word, etc., to such a similarity calculation.

As described above, by classifying documents based on a reference correlation between documents, a user can obtain information about a document group classified from the viewpoint of reference correlation, including a reference reason. If a document is retrieved using the classification result, efficient retrieval can be implemented.

FIG. 24 shows a case where the classification result of documents is used in the time-series display of a reference correlation shown in FIG. 19. In FIG. 24, the vertical and horizontal coordinates represent the type of a document obtained by the classification and time, respectively. According to such a display method, documents which have similar reference correlations are located close to one another, and as a result, reference correlations between a plurality of documents can be displayed so that they are easy to understand.

Although in the preferred embodiments described above, a reference correlation between documents is processed, a reference correlation between a plurality of pieces of arbitrary information can also be processed. For example, if another type of text data, image data, audio data or program list is cited instead of a document, the reference reason of the respective information can be identified and can be used for information retrieval.

Figure 23:
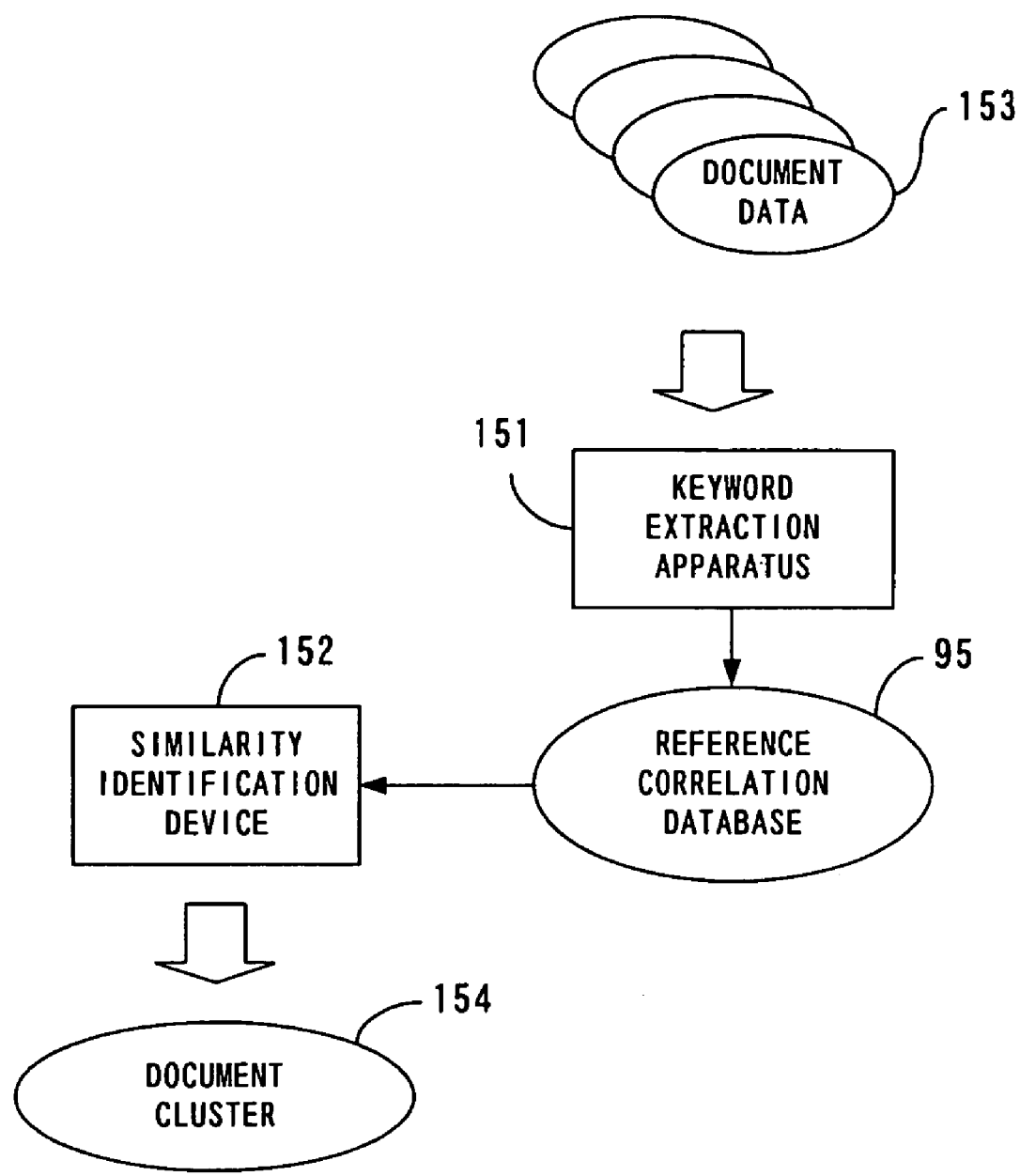
FIG. 23 shows the configuration of a document classifying apparatus.
Figure 25:
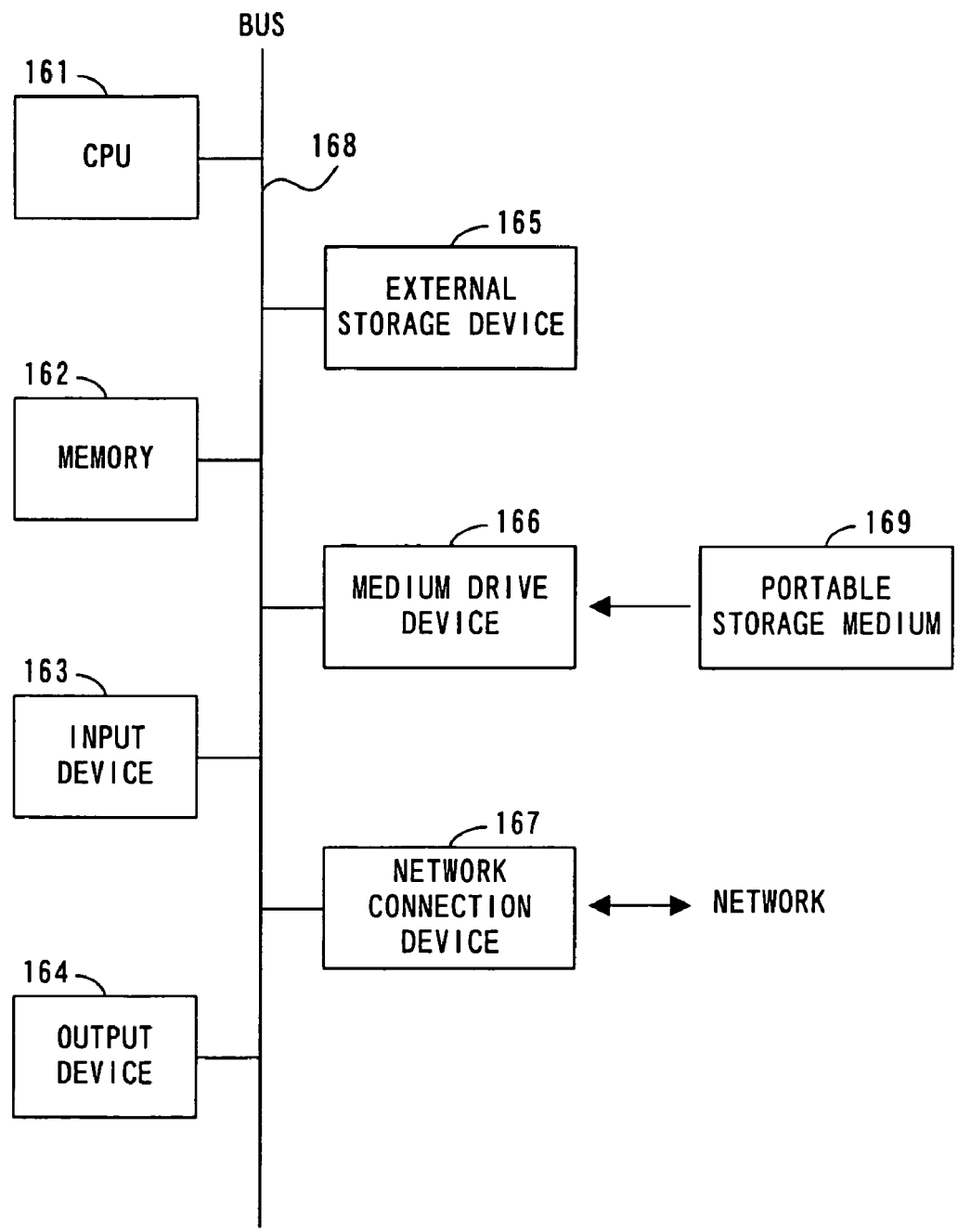
FIG. 25 shows the configuration of an information processing device.

The reference reason identifying apparatus shown in FIG. 2B, information retrieval systems shown in FIGS. 11 and 22, information presenting apparatus shown in FIG. 15, keyword extraction apparatus shown in FIG. 20 and document classifying apparatus shown in FIG. 23 can be configured using an information processing device (computer) shown in FIG. 25. The information processing device shown in FIG. 25 comprises a CPU (central processing unit) 161, a memory 162, an input device 163, an output device 164, an external storage device 165, a medium drive device 166 and a network connection device 167, which are connected to one another by a bus 168.

The memory 162 includes, for example, a ROM (read only memory), RAM (random access memory), etc., and stores both a program and data to be used for the process. The CPU 161 executes the program using the memory 162 and performs necessary processes.

The input device 163 is, for example, a keyboard, pointing device, touch panel, etc., and is used by a user to input an instruction and information. the output device 164 is, for example, a display, printer, speaker, etc., and is used to output both a message and a process result.

The external storage device 165 is, for example, a magnetic disk device, optical disk device, magneto-optical disk device, etc., and is used as the full text database 94 or reference correlation database 95 shown in FIG. 11 or it is used as the document keyword storage unit 141 shown in FIG. 22. The information processing device can store both the program and data described above, and can use the program and data by loading them into the memory 162, if required.

The medium driving device 166 drives a portable storage medium 169 and accesses the recorded content. For the portable storage medium 169, an arbitrary computer-readable storage medium, such as a memory card, floppy disk, CD-ROM (compact disk read only memory), optical disk, magneto-optical disk, etc., is used. The user can store the program and data described above in the portable storage medium, and can use the program and data by loading them into the memory 162, if required.

The network connection device 167 communicates with external devices via an arbitrary network (line) and transmits/receives data accompanying communications. The information processing device can receive the program and data described above via the network connection device 167, and can use the program and data by loading them into the memory 162, if required.

Figure 26:
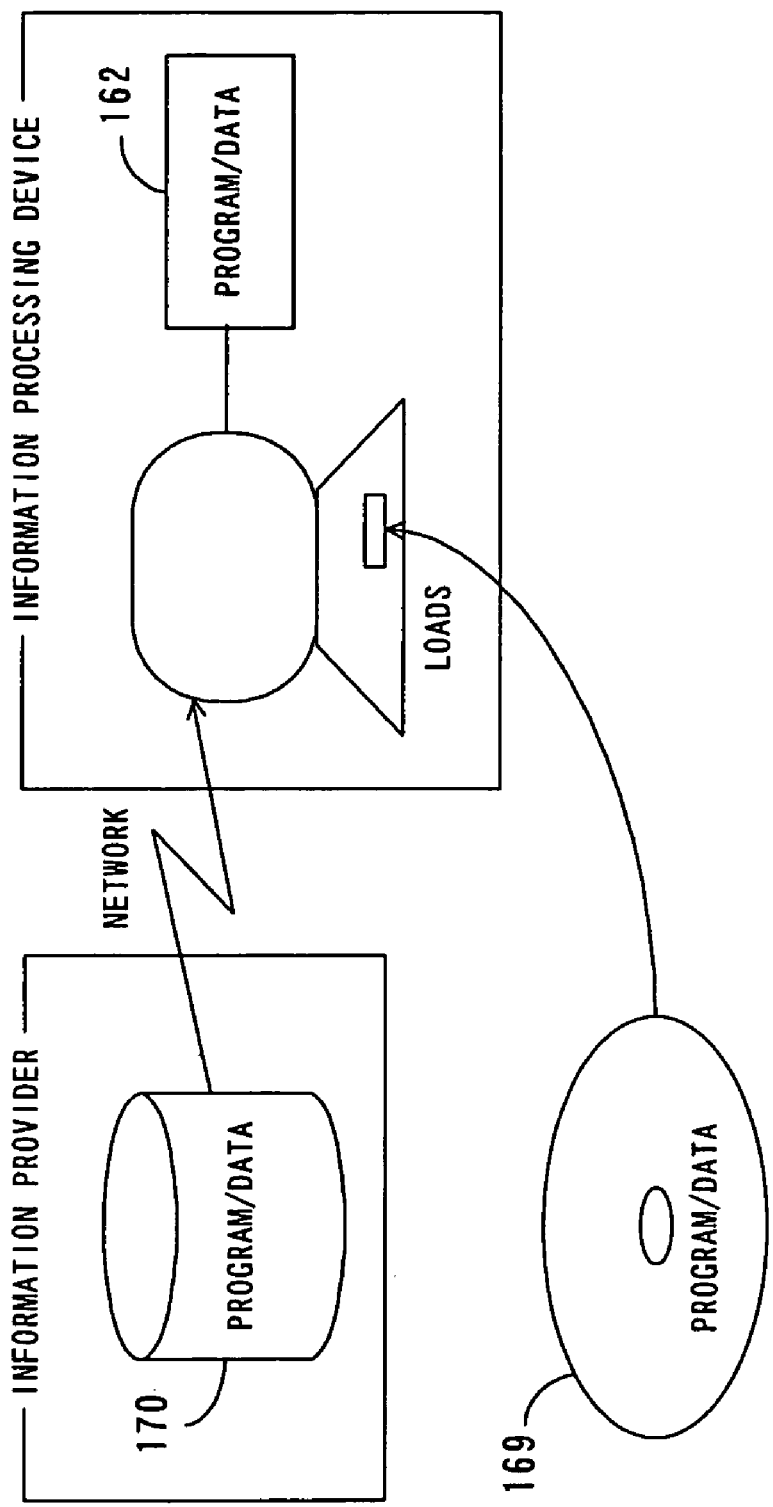
FIG. 26 shows examples of storage media.

FIG. 26 shows computer-readable storage media for supplying the information processing device shown in FIG. 25 with a program and data. The program and data stored in the portable storage medium 169 or external database 170 are loaded into the memory 162. Then, the CPU 161 performs necessary processes by using the data and executing the program.

According to the present invention, a reason why information is cited can be identified by analyzing a part of another piece of information in a document, etc., where the information is cited. If the reference reason of the information is presented to a user, the user can select an arbitrary desired reason among a plurality of pieces of reference reasons, and as a result, efficient information retrieval can be implemented. Furthermore, by presenting a reference correlation between a plurality of pieces of information using the reference reason, the positioning of each piece of information can be distinctly recognized.

What is claimed is:

1. A reference reason identifying apparatus, comprising:
   a reference feature/reference reasons correspondence table indicating correspondence between contexts of character strings and reference reasons;
   a referred document extracting device extracting document information about a referred document from given document data;
   a reference position extracting device extracting information about a position where the referred document is cited in the document data, and a character string in the neighborhood of the position;
   an identification device obtaining a context of an extracted character string by performing language analysis of the extracted character string, and identifying a reason indicating why the referred document is cited by retrieving the reason from the reference feature/reference reason correspondence table using the context of the extracted character string as a reference feature, the reason including at least one of answer, application, basic, contraposition, human, related work, review, software, technique, weak correlation and similar; and
   an output device outputting output information including the information extracted by the referred document extracting device and the reason why the referred document is cited.

2. The references reason identifying apparatus according to claim 1,
   further comprising a document information extracting device extracting document information about the document data from the document data, and
   wherein said output device outputs the information extracted by the document information extracting device together with the output information.

3. The reference reason identifying apparatus according to claim 1, wherein said identification device identifies the reason why the referred document is cited based on at least one of information about a chapter to which the position where the referred document is cited belongs and information about a character string in the neighborhood of the position where the referred document is cited.

4. A keyword extraction apparatus, comprising:
   a reference feature/reference reasons correspondence table indicating correspondence between contexts of character strings and reference reasons;
   a referred document extracting device extracting document information about a referred document from given document data;
   a reference position extracting device extracting information about a position where the referred document is cited in the document data, and a character string in the neighborhood of the position;
   an identification device obtaining a context of an extracted character string by performing language analysis of the extracted character string, and identifying a reason why the referred document is cited by retrieving the reason from the reference feature/reference reason correspondence table using the context of the extracted character string as a reference feature;
   a keyword extraction device extracting keyword information of the referred document from information in the neighborhood of the position where the reference document is cited; and
   an output device outputting output information including the information extracted by the referred document extracting device, the reason why the referred document is cited and the keyword information.

5. An information retrieval apparatus, comprising:
   a document database device storing document data;
   a reference feature/reference reasons correspondence table indicating correspondence between contexts of character strings and reference reasons;
   a reference correlation storage device storing a reference correlation including a context of an extracted character string obtained by performing language analysis of the extracted character string, and an indication of a reason for why a referred document is cited at a position in a specific document, the reason being retrieved from the reference feature/reference reason correspondence table using the context of the extracted character string in the specific document as a reference feature;

a retrieval device retrieving the document data stored in the document database device using the reference correlation stored in the reference correlation storage device; and an output device outputting a retrieval result including the reference reason.

6. The information retrieval apparatus according to claim 5, further comprising:

a referred document extracting device extracting document information about the referred document from the document data of the specific document;

a reference position extracting device extracting information about a position where the referred document is cited in the document data of the specific document;

an identification device analyzing the information extracted by the reference position extracting device and identifying the reference category of the reason why the referred document is cited; and a device storing information including the information extracted by the referred document extracting device and the reference category in said reference correlation storage device.

7. The information retrieval apparatus according to claim 5, wherein said reference correlation storage device stores keyword information of the referred document extracted from the specific document, and said retrieval device retrieves the document data using the keyword information.

8. The information retrieval apparatus according to claim 5, wherein said output device includes a display device graphically displaying the reference correlation based on the reference category.

9. The information retrieval apparatus according to claim 5, wherein said output device includes a display device displaying the reference correlation in a time series.

10. A document classifying apparatus, comprising:

a referred document extracting device extracting document information about a referred document from given document data;

a reference feature/reference reasons correspondence table indicating correspondence between contexts of character strings and reference reasons;

a reference position extracting device extracting information about a position where the referred document is cited in the document data, and a character string in the neighborhood of the position;

an identification device obtaining a context of an extracted character string by performing language analysis of the extracted character string, and identifying a reason why the referred document is cited by retrieving the reason from the reference feature/reference reason correspondence table using the context of the extracted character string as a reference feature;

a similarity identification device calculating a similarity in reference correlation based on the reason indicating why the referred document is cited, between a plurality of pieces of document data, and classifying the plurality of the pieces of the document data; and an output device outputting a classification result.

11. The document classifying apparatus according to claim 10, further comprising a keyword extraction device extracting keyword information of the referred document from information in the neighborhood of the position where the referred document is cited, and wherein said similarity identification device classifies the plurality of the pieces of the document data using the keyword information.

12. An information retrieval apparatus, comprising:

a database device storing information to be retrieved;

a reference feature/reference reasons correspondence table indicating correspondence between contexts of character strings and reference reasons;

a reference correlation storage device storing a reference correlation including a context of an extracted character string obtained by performing language analysis of the extracted character string, and an indication of a reason for why referred information is cited by a specific piece of information at a position in a document, the reason being retrieved from the reference feature/reference reason correspondence table using the context of the extracted character string as a reference feature;

a retrieval device retrieving information stored in the database device using the reference correlation stored in the reference correlation storage device; and an output device outputting a retrieval result including the reason for citing the referred information.

13. A computer-readable storage medium on which is recorded a program enabling a computer to execute a process, said process comprising:

extracting document information about a referred document from given document data;

extracting information about a position where the reference document is cited in the document data, and a character string in the neighborhood of the position;

performing language analysis of the extracted character string to obtain a context of the character string extracted by the reference position extracting device;

retrieving a reason indicating why the referred document is cited from a reference feature/reference reason correspondence table, which indicates correspondence between contexts of character strings and reference reasons, using the context of the character string as a reference feature; and outputting output information including the information about the referred document and the reason why the referred document is cited.

14. A computer-readable storage medium on which is recorded a program enabling a computer to execute a process, said process comprising:

retrieving document data stored in a document database using a reference correlation including a context of an extracted character string obtained by performing language analysis of the extracted character string, and a reason indicating why a referred document is cited at a position in a specific document, the reason being retrieved from a reference feature/reference reason correspondence table, which indicates correspondence between contexts of character strings and reference reasons, using the context of the extracted character string in the specific document in the neighborhood of the position as a reference feature; and outputting a retrieval result including the reason why the referred document is cited.

15. A computer-readable storage medium on which is recorded a program enabling a computer to execute a process, said process comprising:

extracting document information about a referred document from given document data;

extracting information about a position where the referred document is cited in the document data, and a character string in the neighborhood of the position;

analyzing the information about the position where the referred document is cited;

identifying a context of the character string obtained by performing language analysis of the extracted character string, and a reason indicating why the referred document is cited by retrieving from the reference feature/reference reason correspondence table using the context of the character string in the neighborhood of the position as a reference feature;

calculating a similarity in reference correlation based on the reason why the referred document is cited, between a plurality of pieces of document data; and outputting a result including the reason for citing the referred document.

16. A reference reason identifying apparatus, comprising:

reference feature/reference reasons correspondence table means for indicating correspondence between contexts of character strings and reference reasons;

referred document extracting means for extracting document information about a referred document from given document data;

reference position extracting means for extracting information about a position where the referred document is cited in the document data, and a character string in the neighborhood of the position;

identification means for obtaining a context of the character string extracted by said reference position extracting means, by performing language analysis of the character string, and identifying a reason indicating why the referred document is cited in the referring document by retrieving the reason from the reference feature/reference reason correspondence table means using the context of the character string as a reference feature; and output means for outputting output information including the information extracted by the reference document extracting means and the reason why the referred document is cited.

17. An information retrieval apparatus, comprising:

document database means for storing document data;

reference feature/reference reasons correspondence table means for indicating correspondence between contexts of character strings and reference reasons;

reference correlation storage means for storing reference correlations including contexts of character strings obtained by performing language analysis of the extracted character string, and an indication of a reason for why a referred document is cited at a position in a specific document, the reason being retrieved from the reference feature/reference reason correspondence table means using a context of an extracted character string as a reference feature;

retrieval means for retrieving the document data stored in the document database device using the reference correlation stored in the reference correlation storage device; and output means for outputting a retrieval result including the reference reason.

18. A document classifying apparatus, comprising:

referred document extracting means for extracting document information about a referred document from given document data and a position where the referred document is cited in the document;

reference feature/reference reasons correspondence table means for indicating correspondence between contexts of character strings and reference reasons;

reference position extracting means for extracting information about a position where the referred document is cited in the document data, and a character string in the neighborhood of the position;

identification means for obtaining a context of an extracted character string by performing language analysis of the extracted character string, and identifying a reason indicating why the referred document is cited, by retrieving the reason from the reference feature/reference reason correspondence table means using the context of the extracted character string as a reference feature;

similarity identification means for calculating a similarity in reference correlation based on the reason why the referred document is cited, between a plurality of pieces of document data, and classifying the plurality of the pieces of the document data; and output means for outputting a classification result.

19. A keyword extraction apparatus, comprising:

a keyword storage storing a keyword of each piece of document data;

a referred document extracting device extracting document information about a referred document from given document data;

a first pattern data list storage device storing pattern information including numeral patterns and indicating chapter numbers;

a second pattern data list storage device storing pattern information including character string patterns likely to appear in the given document data and indicating documents that are cited;

a reference position extracting device searching the document data for a pattern which matches one of the numeral patterns stored in said first pattern data list storage device, checking whether numerals contained in searched patterns increase consecutively as the document data are searched, and extracting information about a position where the referred document is cited in the document data by searching the document data for a pattern which matches one of the character string patterns stored in said second pattern data list storage device if the numerals increase consecutively;

a keyword extracting device extracting keyword information of the referred document from information in the neighborhood of the extracted position; and a keyword storing device storing the keyword information as a keyword of the referred document in the keyword storage.

* * * * *